(12) United States Patent
Mizuuchi et al.

(10) Patent No.: US 7,230,753 B2
(45) Date of Patent: Jun. 12, 2007

(54) METHOD FOR FORMING DOMAIN-INVERTED STRUCTURE AND OPTICAL ELEMENT WITH DOMAIN-INVERTED STRUCTURE

(75) Inventors: Kiminori Mizuuchi, Neyagawa (JP); Akihiro Morikawa, Osaka (JP); Tomoya Sugita, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 163 days.

(21) Appl. No.: 10/535,975

(22) PCT Filed: Nov. 21, 2003

(86) PCT No.: PCT/JP03/14952

§ 371 (c)(1),
(2), (4) Date: May 24, 2005

(87) PCT Pub. No.: WO2004/049055

PCT Pub. Date: Jun. 10, 2004

(65) Prior Publication Data

US 2006/0051025 A1    Mar. 9, 2006

(30) Foreign Application Priority Data

Nov. 25, 2002  (JP) ............................. 2002-340590
Jan. 23, 2003  (JP) ............................. 2003-014573

(51) Int. Cl.
*G02F 1/00*    (2006.01)
*G02F 2/02*    (2006.01)

(52) U.S. Cl. ...................................... 359/321; 359/332

(58) Field of Classification Search ................ 359/321, 359/322, 323, 326, 332

See application file for complete search history.

(56) References Cited

U.S. PATENT DOCUMENTS 5,193,023 A    3/1993  Yamada et al.

(Continued)

FOREIGN PATENT DOCUMENTS

JP    6-242478    9/1994

(Continued)

OTHER PUBLICATIONS

Chinese Office Action from corresponding Chinese application No. 200380104116.X, mailed Dec. 8, 2006.

*Primary Examiner*—David N. Spector
(74) *Attorney, Agent, or Firm*—Hamre, Schumann, Mueller & Larson, PC

(57) ABSTRACT

A method for forming a domain-inverted structure includes the following: using a ferroelectric substrate (1) having a principal surface substantially perpendicular to the Z axis of crystals; providing a first electrode (3) on the principal surface of the ferroelectric substrate, the first electrode having a pattern of a plurality of electrode fingers (5) that are arranged periodically; providing a counter electrode (6) on the other side of the ferroelectric substrate so as to be opposite from the first electrode; and applying an electric field to the ferroelectric substrate with the first electrode and the counter electrode, thereby forming domain-inverted regions corresponding to the pattern of the first electrode in the ferroelectric substrate. Each of the electrode fingers of the first electrode is located so that a direction from a base to a tip (5a) of the electrode finger is aligned with the Y-axis direction of the crystals of the ferroelectric substrate. This method can provide a short-period uniform domain-inverted structure.

41 Claims, 15 Drawing Sheets

U.S. PATENT DOCUMENTS

| | | |
|---|---|---|
| 5,522,973 A | 6/1996 | Harada |
| 5,568,308 A | 10/1996 | Harada |
| 5,652,674 A * | 7/1997 | Mizuuchi et al. ............ 359/326 |
| 5,668,578 A * | 9/1997 | Nihei et al. ................. 346/74.3 |
| 5,838,486 A | 11/1998 | Sonoda et al. |
| 6,002,515 A * | 12/1999 | Mizuuchi et al. ............ 359/326 |
| 6,731,422 B2 * | 5/2004 | Yamaguchi et al. ......... 359/332 |
| 7,112,263 B2 * | 9/2006 | Nihei .......................... 204/164 |
| 2002/0005980 A1 | 1/2002 | Yamaguchi et al. |

FOREIGN PATENT DOCUMENTS

| | | |
|---|---|---|
| JP | 7-281224 | 10/1995 |
| JP | 9-218431 | 8/1997 |
| JP | 11-258646 | 9/1999 |
| JP | 2001-66652 | 3/2001 |
| JP | 2001-242498 | 9/2001 |

* cited by examiner

Y-axis direction

Crystal axis dependence of length Lr of domain-inverted regions

Y-axis direction

METHOD FOR FORMING DOMAIN-INVERTED STRUCTURE AND OPTICAL ELEMENT WITH DOMAIN-INVERTED STRUCTURE

TECHNICAL FIELD

The present invention relates to a method for forming a domain-inverted structure by applying an electric field, and an optical element that has a domain-inverted structure and is applicable to an optical wavelength conversion element, a polarizer, an optical switch, a phase modulator, or the like.

BACKGROUND ART

Domain inversion is a phenomenon in which the polarization of a ferroelectric material is inverted forcibly. With the use of this phenomenon, domain-inverted regions are arranged periodically inside the ferroelectric material to form a domain-inverted structure. The domain-inverted structure is used, e.g., for an optical frequency modulator that utilizes surface acoustic waves, an optical wavelength conversion element that utilizes the domain inversion of nonlinear polarization, or an optical polarizer that utilizes a domain-inverted structure in the form of a prism or lens. In particular, an optical wavelength conversion element with very high conversion efficiency can be produced by periodically inverting the nonlinear polarization of a nonlinear optical substance. When this optical wavelength conversion element is used to convert the wavelength of light of a semiconductor laser or the like, a small short-wavelength light source can be provided and applied to the field of printing, optical information processing, or optical measurement and control.

The ferroelectric material has a displacement of charge of the crystals due to spontaneous polarization. The direction of the spontaneous polarization can be changed by applying an electric field opposite to the spontaneous polarization. The direction of the spontaneous polarization varies depending on the type of crystal (material). The crystals of a substrate made of $LiTaO_3$, $LiNbO_3$, or a mixed crystal of them, i.e., $LiTa_{(1-x)}Nb_xO_3$ ($0 \leq x \leq 1$), have the spontaneous polarization only in the C-axis direction. Therefore, the polarization of these crystals is present in either of two directions (+ direction and − direction) along the C axis. The application of an electric field rotates the polarization by 180 degrees opposite to its original direction. This phenomenon is called domain inversion. The electric field required for the domain inversion is called a polarization electric field. The polarization electric field is about 20 kV/mm at room temperature for $LiNbO_3$ or $LiTaO_3$ crystals, and about 5 kV/mm for $MgO:LiNbO_3$.

When the ferroelectric material is transformed into crystals having a single polarization direction, the process is referred to as "single domain of polarization". In general, the polarization is changed to a single domain by applying an electric field at high temperatures after crystal growth.

As a conventional method for forming periodically domain-inverted regions, e.g., JP 4(1992)-19719 discloses that a comb-shaped electrode is formed on a $LiNbO_3$ (Lithium niobate) substrate and a pulse electric field is applied to the comb-shaped electrode. In this method, the comb-shaped electrode is formed on the + C plane of the $LiNbO_3$ substrate, while a planar electrode is formed on the − C plane. The + C plane is grounded, and a pulse voltage with a pulse width of 100 μs is applied to the planar electrode on the − C plane so that the polarization is inverted by the pulse electric field applied to the substrate. The electric field required to invert the polarization is not less than about 20 kV/mm. When the electric field of such a value is applied to a thick substrate, the crystals of the substrate may be damaged. However, a substrate having a thickness of about 200 μm can avoid the crystal damage caused by the applied electric field and also can form domain-inverted regions at room temperature. Thus, the domain-inverted regions can be deep enough to penetrate the substrate.

A domain-inverted structure with a short period of 3 to 4 μm is necessary to achieve a high-efficiency optical wavelength conversion element. When an electric field is applied so as to form domain-inverted regions, the polarization directly under the electrode is inverted, and then the domain-inverted regions expand in the lateral direction of the substrate. Therefore, it is difficult to provide a short-period domain-inverted structure. To solve this problem, a conventional method employs a pulse width of about 100 μs and applies a pulse voltage to the electrode for a short time, thereby providing a short-period domain-inverted structure.

As a method for forming a short-period domain-inverted structure in a Mg-doped $LiNbO_3$ substrate (referred to as MgLN in the following), e.g., JP 6(1994)-242478 discloses a method for forming a periodically domain-inverted structure in a MgLN of a Z plate. In this method, a comb-shaped electrode is formed on the + Z plane of the MgLN, and the substrate is irradiated with corona from the underside, thus providing a domain-inverted structure that has a period of 4 μm and penetrates the 0.5 mm thick substrate.

JP 9(1997)-218431 discloses a method for forming a domain-inverted structure in an off-cut MgLN. An electrode is formed on the off-cut MgLN whose polarization direction slightly tilts from the substrate surface, and a voltage is applied to the electrode, thus providing an acicular domain-inverted structure. The domain-inverted regions grow in the polarization direction of the crystals, and the domain-inverted structure has a period of about 5 μm.

However, it has been difficult to form a fine domain-inverted structure in a Mg-doped $LiTa_{(1-x)}Nb_xO_3$ ($0 \leq x \leq 1$) substrate of a Z plate. Although the domain-inverted structure can be formed in the off-cut substrate by applying an electric field with the conventional method, only a complicated technique such as corona poling is known for forming a fine uniform domain-inverted structure in the Z-plate substrate. In the corona poling, charged particles are deposited on the substrate to generate an electric field for inverting the polarization. However, there is a limit to the magnitude of the electric field generated by the charged particles. Therefore, the thickness of a substrate available to form a domain-inverted structure is limited to about 0.5 mm, and the domain-inverted structure cannot be formed in the substrate having a large thickness of more than 1 mm. On the other hand, the application of a voltage using the electrode is effective in forming a domain-inverted structure in the off-cut substrate. However, such a system is not useful to form a domain-inverted structure widely and uniformly in the Z plate.

JP 2001-66652 discloses that a comb-shaped electrode is formed on a MgLN of a Z plate, and a voltage is applied to the comb-shaped electrode, thereby providing a periodically domain-inverted structure. This method has the advantage of forming the periodically domain-inverted structure uniformly. However, the domain inversion is limited to part of the end of the electrode. Thus, it is difficult to form a domain-inverted structure deeply and uniformly in a wide range of the substrate under the electrode.

DISCLOSURE OF INVENTION

It is an object of the present invention to provide a method for forming a short-period wide domain-inverted structure deeply and uniformly in a ferroelectric substrate.

A method for forming a domain-inverted structure of the present invention includes the following: using a ferroelectric substrate having a principal surface substantially perpendicular to the Z axis of crystals; providing a first electrode on the principal surface of the ferroelectric substrate, the first electrode having a pattern of a plurality of electrode fingers that are arranged periodically; providing a counter electrode on the other side of the ferroelectric substrate so as to be opposite from the first electrode; and applying an electric field to the ferroelectric substrate with the first electrode and the counter electrode, thereby forming domain-inverted regions corresponding to the pattern of the first electrode in the ferroelectric substrate. In this method, each of the electrode fingers of the first electrode is located so that a direction from a base to a tip of the electrode finger is aligned with the Y-axis direction of the crystals of the ferroelectric substrate.

An optical element of the present invention includes a ferroelectric substrate having a plane substantially perpendicular to the Z axis of crystals, and a plurality of domain-inverted regions formed periodically in the ferroelectric substrate. Each of the domain-inverted regions has a planar shape with axial symmetry, and the symmetry axes are parallel to each other. In this optical element, the domain-inverted regions are formed so that a direction of the symmetry axes is aligned with the Y axis of the crystals of the ferroelectric substrate. The domain-inverted regions extend from the + Z plane to the − Z plane. The ratio of an area of the domain-inverted regions penetrating from the upper to the lower surface of the ferroelectric substrate with respect to a total area of the domain-inverted regions is 50% or less, or the mean depth of the domain-inverted regions is 40% to 95% of the thickness of the ferroelectric substrate.

DESCRIPTION OF THE INVENTION

Figure 1A:
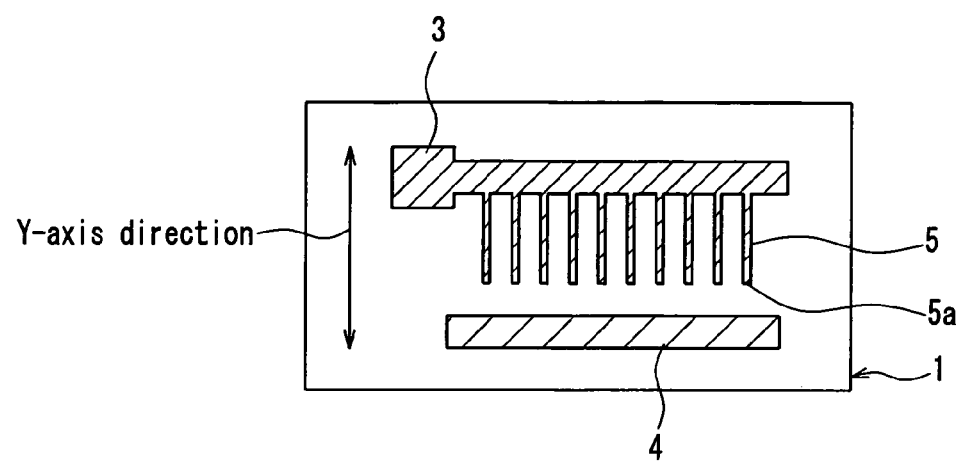
FIG. 1A is a plan view showing an electrode structure used in a method for forming a domain-inverted structure in Embodiment 1 of the present invention.

In the method for forming a domain-inverted structure of the present invention, the electrode fingers of the first electrode for applying an electric field to the ferroelectric substrate are located so that a direction from the bases to the tips of the electrode fingers is aligned with the Y-axis direction of the crystals of the ferroelectric substrate. Thus, fine domain-inverted regions can be formed. This effect is based on the fact that the expansion of domain inversion in the Y-axis direction is several times larger and more uniform than that in the X-axis direction. Moreover, a voltage is concentrated on each of the tips of the electrode fingers that are arranged periodically. Therefore, when domain inversion occurs in the Z-plate substrate by using the above electrode, the domain-inverted regions can be formed efficiently.

In the method for forming a domain-inverted structure of the present invention, it is preferable that the electric field is applied to the ferroelectric substrate so that the ratio of an area of the domain-inverted regions penetrating from the upper to the lower surface of the ferroelectric substrate with respect to a total area of the domain-inverted regions is suppressed to 50% or less. With this configuration, a fine domain-inverted structure can be formed uniformly. In the ferroelectric substrate having a plane substantially perpendicular to the Z axis of the crystals, when the domain-inverted regions are formed partially and penetrate the substrate to cause a short circuit between the electrodes, the expansion of the domain-inverted regions is concentrated in those portions penetrating the substrate and may interfere with uniform domain inversion. Therefore, suppressing such an area of the domain-inverted regions that penetrate the substrate is effective in ensuring the uniformity of a domain-inverted structure.

In this configuration, it is preferable that a thickness T of the ferroelectric substrate is 1 mm or more.

It is preferable that the electric field is applied to the ferroelectric substrate so that a mean value of a depth D of the domain-inverted regions is 40% to 95% of the thickness of the ferroelectric substrate. This can provide the same effect as described above.

The above method is suitable particularly for the ferroelectric substrate of Mg-doped $LiTa_{(1-x)}Nb_xO_3$ ($0 \leq x \leq 1$).

The first electrode may be a comb-shaped electrode, and the electrode fingers may be in the form of stripes. Moreover, the electrode fingers of the first electrode may be in the form of triangles, and a vertex of the triangle may serve as the tip of each of the electrode fingers. Alternatively, each of the electrode fingers may have a shape that is symmetrical with respect to the axis along the direction from the base to the tip of the electrode finger, and may be located so that the axis of symmetry is aligned with the Y-direction of the crystals of the ferroelectric substrate.

It is preferable that a width of the tip of each of the electrode fingers is 5 μm or less.

It is preferable that the process of applying an electric field to the ferroelectric substrate further includes applying a pulse voltage with a field intensity of E1 and applying a direct-current voltage with a field intensity of E2, and E1 and E2 satisfy E1>E2. With this configuration, the pulse shape of the applied voltage can be controlled so that uniform domain-inverted regions are formed in the widest possible range of the substrate under the designed electrode while expanding along the electrode. When domain inversion occurs in the Z-plate substrate by using the electrode with tips, a voltage is concentrated on the tips, where the domain-inverted regions can be formed efficiently. To facilitate the expansion of the domain-inverted regions throughout the electrode, it is useful to use the pulse voltage with the direct-current voltage as an applied electric field. In other words, domain nuclei are created by the pulse voltage, and domain-inverted regions can be expanded from the domain nuclei by the direct-current voltage.

It is preferable that the field intensity E1 is larger than 6 kV/mm, and the field intensity E2 is smaller than 5 kV/mm. Moreover, it is preferable that the pulse voltage includes at least two pulse trains.

In the method for forming a domain-inverted structure of the present invention, it is preferable that the ferroelectric substrate is heat-treated at 200° C. or more after the domain-inverted regions are formed, and the generation of a pyroelectric charge in the ferroelectric substrate is suppressed during the heat treatment. This can improve the stability of the domain-inverted regions formed by the application of an electric field, and also can reduce scattering due to domain inversion.

It is preferable that the upper and the lower surface of the ferroelectric substrate are short-circuited electrically during the heat treatment. It is also preferable that a rate of temperature rise in the heat treatment is 10° C./min or less.

The above method is suitable for the ferroelectric substrate having a polarization electric field of 5 kV/mm or less. The crystals of the ferroelectric substrate may have a substantially stoichiometric composition.

In the method for forming a domain-inverted structure of the present invention, it is preferable that a second electrode is provided on the principal surface and is located opposite to the first electrode with a space between the tips of the electrode fingers of the first electrode and the second electrode. The second electrode serves to assist the concentration of an electric field on the tips of the first electrode. When the electric field is concentrated on the tips of the first electrode, domain nuclei are created, and thus domain inversion starts to grow quickly.

It is preferable that a shortest distance L between the tips of the electrode fingers and the second electrode, and a thickness T of the ferroelectric substrate satisfy L<T/2. With this configuration, the effect of the second electrode can be obtained sufficiently. The relationship between the distance L and the substrate thickness T affects the electric field distribution of the tips of the electrode fingers. Therefore, if the distance L is T/2 or more, the effect of the second electrode becomes excessively small.

It is preferable that the domain-inverted regions are formed under the first electrode and the second electrode by applying a voltage between the first electrode and the counter electrode. When a voltage is applied individually to the electrodes in the same plane, the domain-inverted regions are formed under each of the adjacent electrodes. Therefore, this configuration is very effective in forming the domain-inverted regions widely.

It is preferable that the above method further includes a first electric field application process of applying a voltage between the first electrode and the counter electrode, and a second electric field application process of applying a voltage between the second electrode and the counter electrode. It is also preferable that the domain-inverted regions are formed under the first electrode and the second electrode by the first electric field application process and the second electric field application process. Moreover, it is preferable that the first electric field application process and the second electric field application process are performed separately.

The second electrode may have a plurality of electrode fingers with tips opposed to the tips of the electrode fingers of the first electrode, and the electrode fingers of the second electrode may be located so that a direction from a base to a tip of the electrode finger is aligned with the Y-axis direction of the crystals of the ferroelectric substrate.

It is preferable that a distance L between the first electrode and the second electrode is 50 μm≦L≦200 μm.

It is preferable that either of the first electric field application process and the second electric field application process applies an electric charge at least 100 times larger than 2 PsA, where Ps is spontaneous polarization of the ferroelectric substrate and A is a desired area of the domain-inverted regions. It is also preferable that the first electric field application process applies a pulse voltage with a field intensity of E1 and a pulse width of τ≦10 msec, the second electric field application process applies a direct-current voltage with a field intensity of E2 and a pulse width of τ≧1 sec, and E1 and E2 satisfy E1>E2.

It is preferable that the electric field is applied to the ferroelectric substrate in an insulating solution at 100° C. or more. The angle θ between the principal surface and the Z axis may be 80°≦θ≦100°. It is also preferable that a thickness T of the ferroelectric substrate is 1 mm or more, and a period Λ of the domain-inverted regions is 2 μm or less. Moreover, it is preferable that a depth D of the domain-inverted regions and the thickness T of the ferroelectric substrate satisfy D<T.

It is preferable that a thickness T of the ferroelectric substrate is T≧1 mm, an insulating layer is formed between the counter electrode and the ferroelectric substrate, and a pulse voltage with a pulse width of 1 msec to 50 msec is applied between the first electrode and the counter electrode. The insulating layer may be a $SiO_2$ layer, a $TO_2$ layer or a $Ta_2O_5$ layer. Alternatively, it is also preferable that a thickness T of the ferroelectric substrate is $T \geq 1$ mm, a semiconductor layer is formed between the counter electrode and the ferroelectric substrate, and a pulse voltage with a pulse width of 1 msec to 50 msec is applied between the first electrode and the counter electrode. The semiconductor layer may be a Si layer, a ZnSe layer, or a GaP layer.

In the optical element of the present invention, the ratio of an area of the domain-inverted regions penetrating from the upper to the lower surface of the ferroelectric substrate with respect to a total area of the domain-inverted regions is 50% or less, or the mean depth of the domain-inverted regions is 40% to 95% of the thickness of the ferroelectric substrate. Thus, a fine domain-inverted structure can be formed uniformly. In the ferroelectric substrate having a plane substantially perpendicular to the Z axis of the crystals, when the domain-inverted regions penetrate the substrate to cause a short circuit between the electrodes, the expansion of the domain-inverted regions is concentrated in those portions penetrating the substrate and may interfere with uniform domain inversion. Therefore, suppressing such an area of the domain-inverted regions that penetrate the substrate is effective in ensuring the uniformity of a domain-inverted structure.

The ferroelectric substrate may be Mg-doped $LiTa_{(1-x)}Nb_xO_3$ ($0 \leq x \leq 1$). The domain-inverted regions may have a period of 4 μm or less. The ferroelectric substrate may have a thickness of 1 mm or more. It is preferable that a thickness T of the ferroelectric substrate is 1 mm, and a period Λ of the domain-inverted regions is 2 μm or less. Moreover, it is preferable that a depth D of the domain-inverted regions and the thickness T of the ferroelectric substrate satisfy D<T. The angle θ between the principal surface and the Z axis may be $80° \leq \theta \leq 100°$.

Hereinafter, embodiments of the present invention will be described in detail with reference to the drawings.

EMBODIMENT 1

Figure 1B:
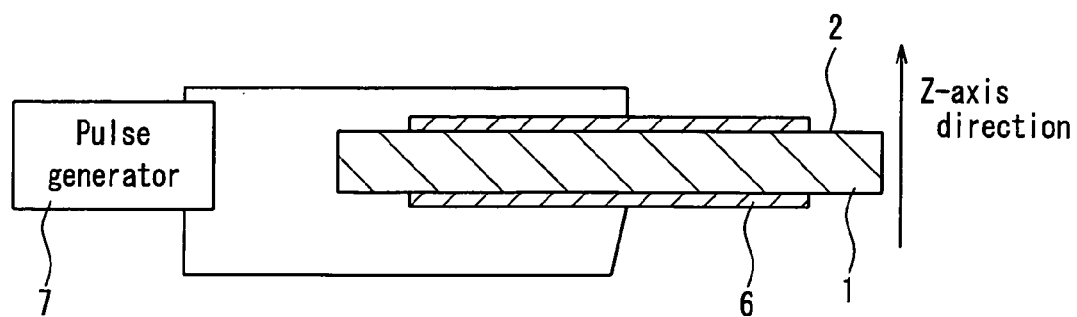
FIG. 1B is a cross-sectional view of FIG. 1A.

FIG. 1A is a plan view showing an electrode structure used in a method for forming a domain-inverted structure in Embodiment 1 of the present invention. FIG. 1B is a cross-sectional view of the electrode structure.

A first electrode 3 having a comb pattern is formed on a principal surface 2 of an MgLN substrate 1. A plurality of electrode fingers 5 constituting the first electrode 3 are arranged periodically in the form of narrow stripes. Therefore, fine tips 5a of the electrode fingers 5 are arranged periodically. A second electrode 4 is formed on the principal surface 2 and is located at a predetermined distance away from the tips 5a of the first electrode 3. The first electrode 3 and the second electrode 4 are insulated electrically. A counter electrode 6 is provided on the underside of the MgLN substrate 1 so as to be opposite from the first electrode 3 and the second electrode 4. The shape of the counter electrode 6 may be, e.g., a rectangular plane that covers a region corresponding to the first electrode 3 and the second electrode 4, and no particular pattern is necessary.

The electrode fingers 5 of the first electrode 3 are located so that the symmetry axis of each stripe is aligned with the Y-axis direction of crystals of the MgLN substrate 1. In other words, the tips 5a extend from the bases of the electrode fingers 5 in the Y-axis direction.

A pulse generator 7 applies a controlled voltage to the MgLN substrate 1 between the first electrode 3 and the counter electrode 6, so that domain-inverted regions are formed in a ferroelectric material between the electrodes. The controlled voltage is a pulse voltage or direct-current voltage having a predetermined voltage level or duration, which will be described in detail later.

To avoid the generation of electric discharge during the voltage application, the substrate 1 is placed in an insulating liquid or vacuum ($10^{-6}$ Torr or less), and then a direct-current voltage is applied to the substrate 1. When domain inversion occurs, a current (referred to as "polarization current") proportional to the magnitude of spontaneous polarization of the ferroelectric material and the electrode area flows between the first electrode 3 and the second electrode 4.

It has been difficult to form the domain-inverted regions in MgLN of a Z plate with high reproducibility, even if only a pulse, a direct-current voltage, or a voltage obtained by superimposing a pulse on a direct-current voltage is applied to the conventional electrode configuration. In contrast, this embodiment can form a short-period uniform domain-inverted structure by employing the following conditions.

The uniformity of a periodic structure in domain inversion means the stability of a period or duty ratio. When a domain-inverted structure is used for wavelength conversion, the uniformity affects the conversion efficiency. For example, when the domain-inverted structure is formed periodically over a length of about 10 mm, the periodic structure is disturbed in part. The main reason for such nonuniformity is that the domain-inverted regions expand partially in the lateral direction, and a portion in which the duty ratio is disturbed significantly is present locally. In a conventional method, there were several tens of nonuniform portions per 10 mm of the domain-inverted structure. When the period was 3 μm or less, the nonuniform portions covered almost all over the area. Therefore, the conversion efficiency was only about several to 50% of a theoretical value. In contrast, the improved uniformity of this embodiment can be represented, e.g., by a few nonuniform portions or less per 10 mm of the domain-inverted structure. For wavelength conversion, the improved uniformity results in very high conversion efficiency close to the theoretical value (90% or more).

The conditions of this embodiment mainly relate to
 (a) electrode shape,
 (b) relationship between an electrode direction and a crystal axis, and
 (c) applied pulse shape.

When these factors satisfy specific requirements, a fine domain-inverted structure can be formed uniformly.

Figure 2A:
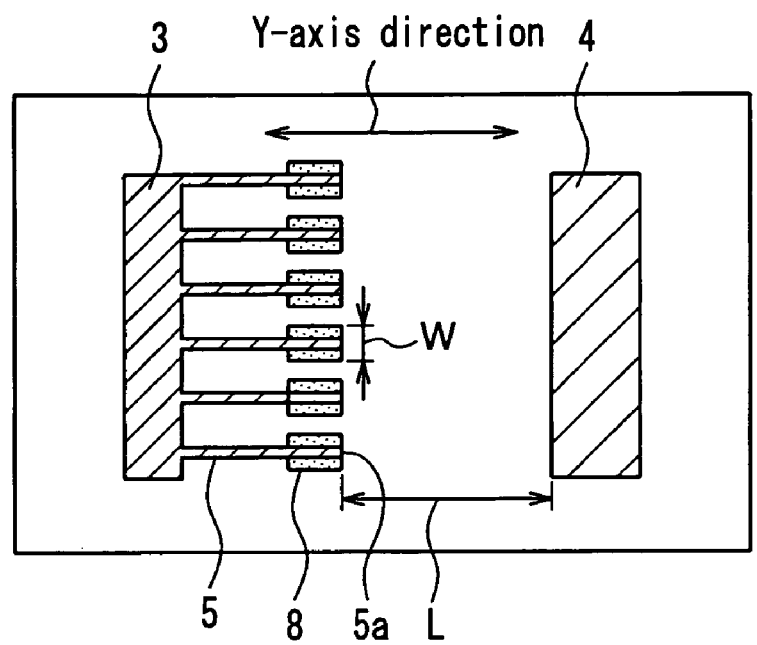
FIG. 2A is a plan view showing the state of domain-inverted regions formed by the method in Embodiment 1.
Figure 2B:
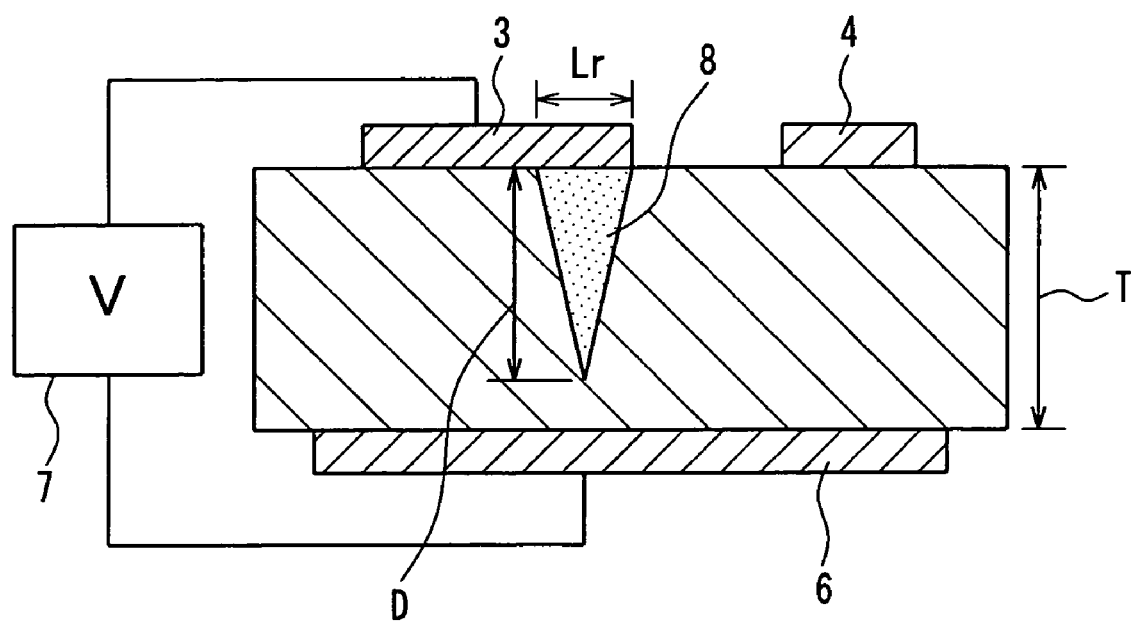
FIG. 2B is a side view of FIG. 2A.

First, (a) electrode shape is described below. Referring to FIGS. 2A and 2B, the shape of domain-inverted regions that are formed in the ferroelectric material when a voltage is applied by the first electrode 3 having fine tips will be explained. Upon applying a voltage, domain-inverted regions 8 are formed in the end portion of the first electrode 3. At this time, an electric field is concentrated on the fine tips 5a of the electrode. Therefore, domain nuclei are created first in this portion, and then the domain-inverted regions expand.

In an ideal domain-inverted structure, the domain-inverted regions have a small width W and a long length Lr. It becomes easier to control the domain-inverted regions precisely as the width W is smaller. For example, if the width W is small, a short-period domain-inverted structure can be formed. Moreover, the domain-inverted regions can be broader as the length Lr is longer.

When the end of the pattern electrode is not fine but wide, the domain-inverted regions cannot be formed uniformly. Since an electric field is formed evenly under the electrode, the domain nuclei are generated everywhere, and the domain-inverted regions expand from these nuclei. In contrast, the electrode structure of this embodiment allows the domain nuclei to be formed exactly at the end of the electrode. Therefore, the controllability of forming the domain-inverted regions can be improved, resulting in a uniform domain-inverted structure. This method is particularly useful for a substrate made of Mg-doped $LiNbO_3$, Mg-doped $LiTaO_3$, or a mixture of them, i.e., Mg-doped $LiTa_{(1-x)}Nb_xO_3$ ($0 \leq x \leq 1$).

In particular, it is known that the domain-inverted regions formed in Mg-doped $LiTa_{(1-x)}Nb_xO_3$ ($0 \leq x \leq 1$) crystals have the rectification properties. Therefore, a current flows through the portions where the domain-inverted regions are formed. Once the domain-inverted regions are formed, they expand from the inverted domains. In the portions where no domain inversion occurs, the applied voltage is reduced due to rectification of the domain-inverted regions, so that domain inversion is not likely to occur. Accordingly, the nonuniformity of the domain-inverted regions is increased, which makes it difficult to provide a uniform domain-inverted structure. This tendency is prominent particularly for a fine shape.

Figure 3A:
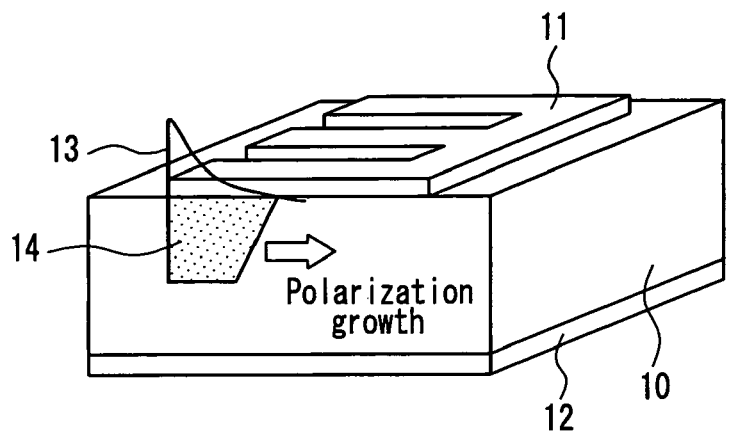
FIG. 3A is a perspective view for explaining the superiority of an electrode having fine tips.
Figure 3B:
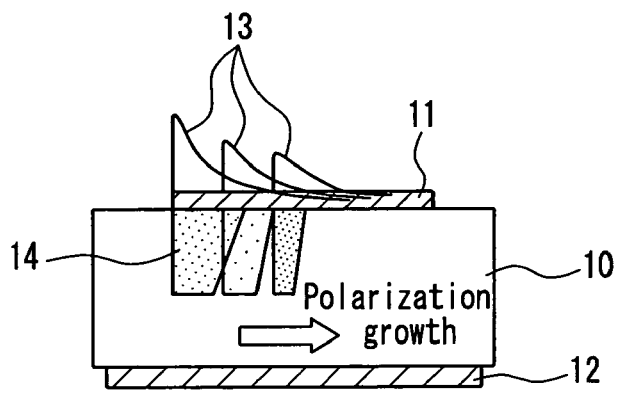
FIG. 3B is a cross-sectional view of FIG. 3A.

The superiority of the electrode having fine tips is described below. As shown in FIG. 3A, a comb-shaped electrode 11 is formed on the +Z plane of a MgLN substrate 10, and a planar electrode 12 is formed on the −Z plane of the MgLN substrate 10. When a voltage is applied between the electrodes, an electric field 13 is concentrated on the end portion of the comb-shaped electrode 11. Therefore, the field intensity of the end portion is larger than that of the other portions. Consequently, domain nuclei are generated and act as a trigger for the expansion of domain-inverted regions 14 from the domain nuclei. In an electrode structure with a flat end portion, however, the domain nuclei are generated at random positions due to the nonuniformity of crystals or the presence of microdomain, and thus cannot be controlled easily. On the other hand, the electrode structure with a fine end portion of this embodiment allows the electric field to be concentrated on the end portion of the electrode. The field intensity is increased locally in the end portion, so that it is possible to control the positions at which the domain nuclei are to be generated. As shown in FIG. 3B, when the domain nuclei are generated in the end portion of the comb-shaped electrode 11, the domain-inverted regions grow from these nuclei along the electrode to increase in length Lr. The use of the electrode having fine tips can control the region in which the domain nuclei are to be generated, and thus can provide a uniform domain-inverted structure.

In the case of electrode shape without fine tips, such as a ladder electrode or planar electrode, the electric field is not concentrated in the end portion, and domain nuclei are generated at random locations under the electrode. Therefore, the domain inversion cannot be controlled, which makes it difficult to form a required uniform shape. Thus, the fine tips of the electrode fingers should have a width small enough to draw the electric field applied by the electrode sufficiently. In this case, "to draw the electric field sufficiently" indicates the degree of concentration of the electric field necessary for providing a uniform domain-inverted structure. The tip width is preferably 5 μm or less, more preferably 2 μm or less because the domain-inverted structure can have high uniformity, and further preferably 1 μm or less because the domain-inverted structure can be made finer.

Figure 3C:
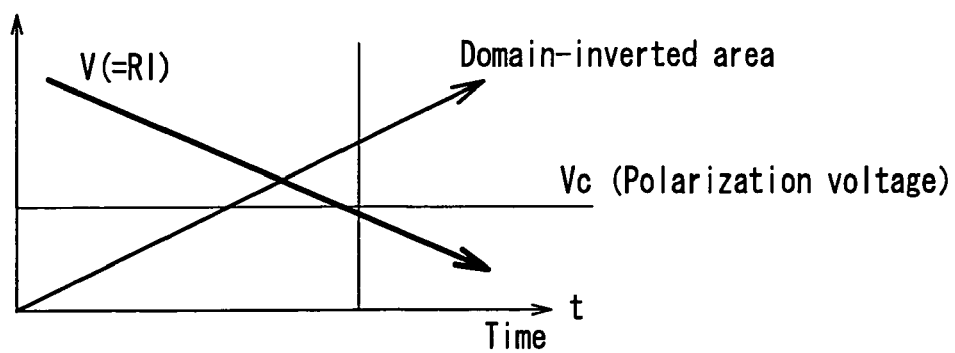
FIG. 3C is a graph showing a change in characteristics of a ferroelectric substrate with the expansion of domain-inverted regions.

As described above, the electric resistance of the domain-inverted regions is reduced significantly in MgLN. Therefore, the resistance decreases when increasing the domain-inverted regions. While the amount of current of the applied pulse is maintained constant, the applied voltage decreases when increasing the domain-inverted regions, as shown in FIG. 3C. When the applied voltage is reduced to a polarization voltage Vc or less, the growth of the domain-inverted regions is suppressed automatically.

Figure 4A:
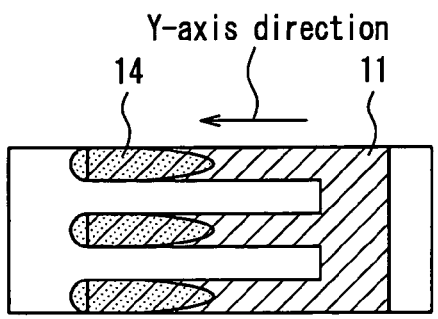
FIGS. 4A and 4B are a plan view and a cross-sectional view showing a way of expanding domain-inverted regions, respectively.
Figure 4B:
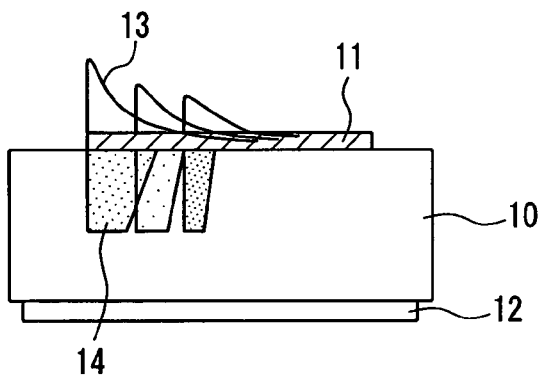
Figure 5A:
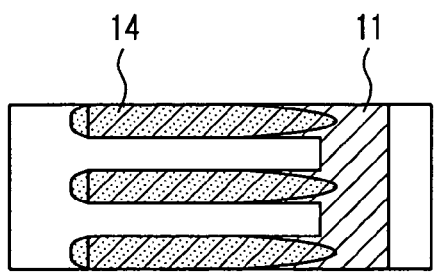
FIGS. 5A and 5B are a plan view and a cross-sectional view showing a way of expanding domain-inverted regions, respectively.
Figure 5B:
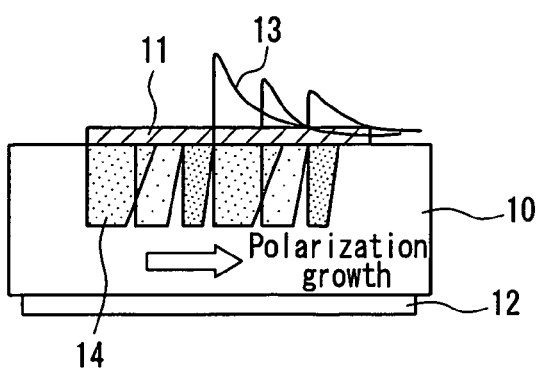

To increase the domain-inverted regions further, it is necessary to consider a change in the electric characteristics of the domain-inverted regions. Referring to FIGS. 4A, 4B, 5A, and 5B, a polarization process of expanding the domain-inverted regions further is explained below. As described above, the growth of the domain-inverted regions 14 is suppressed with expansion. This may be avoided by setting a large current value. However, under the initial conditions of a high resistance, a large current flows into the domain-inverted regions, causing a dielectric breakdown due to temperature rise or abrupt lateral expansion of the domain-inverted regions. To prevent this, first, a relatively low current (e.g., at most 0.1 mA) flows to form domain-inverted regions, as shown in FIGS. 4A and 4B. After the growth of domain inversion has been stopped, the maximum current value is raised further to accelerate the growth of the domain-inverted regions, as shown in FIGS. 5A and 5B. By repeating these processes, the length Lr can be made longer.

The second electrode 4 is effective in increasing the length Lr of the domain-inverted regions. The second electrode 4 is located at a distance L away from the tips of the first electrode 3. The second electrode 4 serves to assist the concentration of the electric field on the tips 5a of the first electrode 3. As described above, when the domain-inverted regions are formed, the electric field is concentrated on the tips of the first electrode 3 to create domain nuclei, and the domain inversion starts to grow. The electric field distribution at the tips of the first electrode 3 is affected by the counter electrode 6 and the second electrode 4. The distance L between the first and second electrodes 3, 4 and the substrate thickness T affect the electric field distribution at the tips 5a of the electrode fingers 5, and therefore significantly affect the length Lr of the domain-inverted regions to be formed.

The experiment showed that uniform domain inversion is likely to occur when the distance L is shorter than the substrate thickness T. If the distance L is the substrate thickness T or more, the effect of the second electrode 4 may be too small to increase the length Lr. If the distance L is excessively short, an electric discharge is generated between the first and second electrodes 103, 104. Therefore, the distance L is preferably 5 μm or more, and L<T/2 is more preferred to increase the length Lr of the domain-inverted regions.

Figure 6:
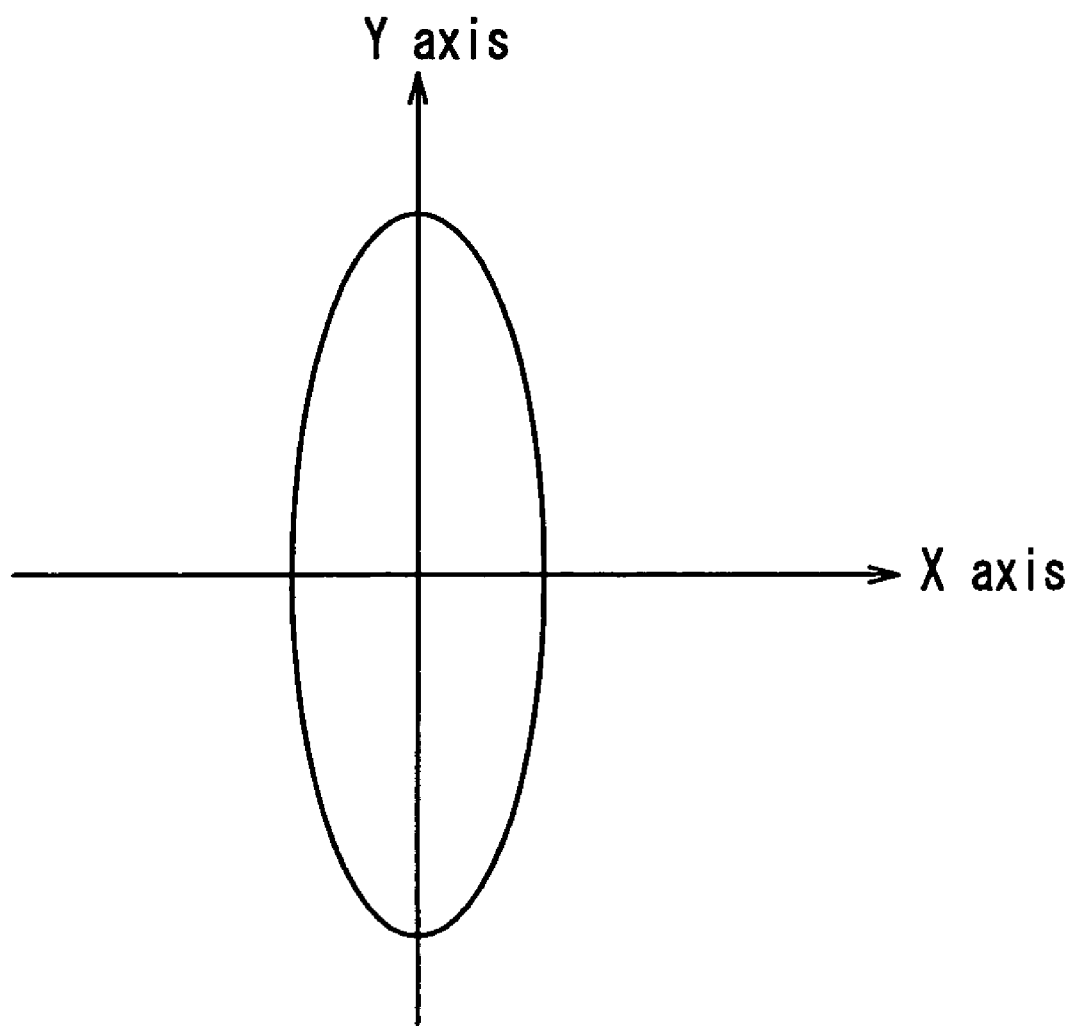
FIG. 6 is a characteristic diagram showing the relationship between the length Lr of domain-inverted regions formed by the method in Embodiment 1 and the crystal orientation of a substrate.

Next, (b) relationship between an electrode direction and a crystal axis is described below. The relationship between the direction of the electrode fingers 5 and the length Lr of the domain-inverted regions was evaluated. MgLN is a uniaxial crystal and has been considered as being symmetrical about a plane perpendicular to the Z axis. In particular, there would have been no dependence of the domain inversion characteristics on the X-axis and Y-axis directions. However, it becomes clear that the domain inversion characteristics of the Z-plate substrate significantly depend on the X axis and Y axis of the crystals. FIG. 6 shows the crystal axis dependence of the length Lr of the domain-inverted regions to be formed. The direction of the electrode fingers 5 is rotated in the X-axis or Y-axis direction, and the length Lr of the domain-inverted regions in each of the directions is expressed by a distance from the origin in FIG. 6. When the tips of the electrode fingers 5 are oriented in the Y-axis direction, and the axial direction of the electrode fingers 5 is aligned with the Y-axis direction, the length Lr of the domain-inverted regions is very long. In contrast, when the electrode fingers 5 are arranged along the X-axis direction, the length Lr is reduced by more than half.

The size of domain inversion varies more with the electrode fingers 5 formed in the X-axis direction than with the electrode fingers 5 formed in the Y-axis direction. When the electrode fingers 5 are formed in the Y-axis direction, a variation in size of the domain-inverted regions is several % or less, and the domain-inverted structure can be uniform and available for practical use. As long as the direction of the electrode fingers 5 tilts at ±10° or less with respect to the Y axis, the length Lr is relatively long, and the domain-inverted structure can be sufficiently uniform for practical use. If the direction of the electrode fingers 5 tilts at ±5° or less, the uniformity can be improved further. If the direction of the electrode fingers 5 tilts at more than ±10°, the length Lr is reduced significantly while the nonuniformity is increased.

As described above, the important conditions of forming a uniform domain-inverted structure are that the electrode fingers having fine tips are formed with the axial direction aligned with the Y-axis direction of the crystals. In the process of formation of the domain-inverted regions, an electric field is concentrated on the tips of the electrode fingers, and the surface electric field of this portion is higher than that of the other portions, thereby creating domain nuclei. Subsequently, the domain-inverted regions expand under the electrode fingers from the nuclei, so that domain inversion occurs. In this case, when the axial direction of the electrode fingers is oriented in the Y-axis direction, the domain inversion is likely to expand in the Y-axis direction of the crystals, resulting in uniform domain inversion. If the electrode does not have fine tips, the domain nuclei are formed randomly, which leads to random expansion of the domain-inverted regions. Thus, it is difficult to form a fine domain-inverted shape, particularly a uniform domain-inverted structure of 10 μm or less. When the tips of the electrode fingers are oriented in the X-axis direction, it is difficult to form a fine structure uniformly while ensuring a sufficient length Lr.

Figure 7A:
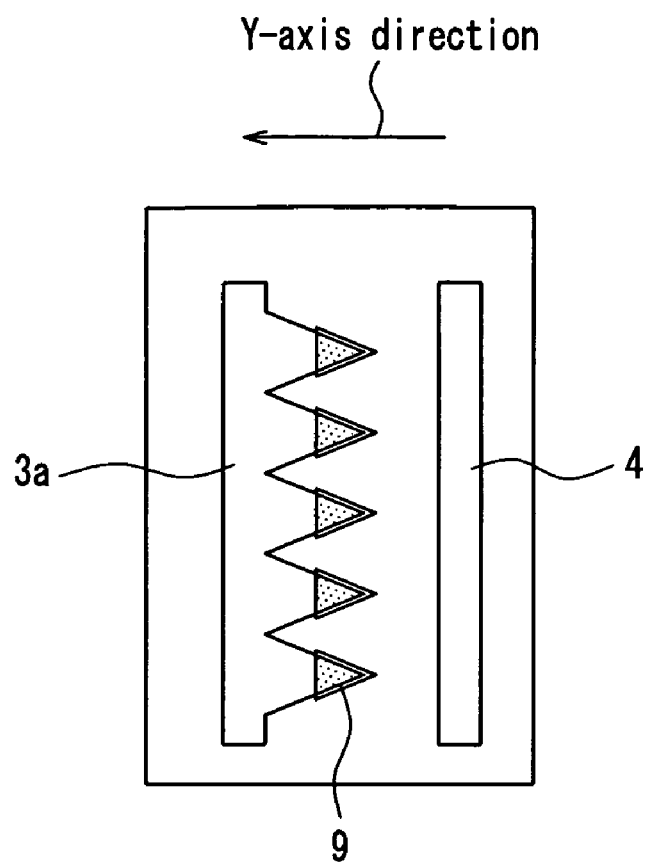
FIG. 7A is a plan view showing another electrode structure.
Figure 7B:
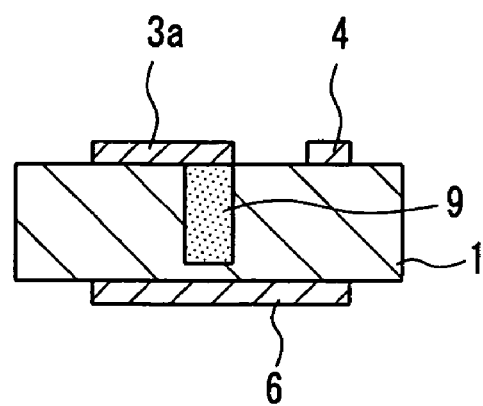
FIG. 7B is a cross-sectional view of FIG. 7A.

As a pattern of the periodic shape of the first electrode, a triangular shape as shown in FIGS. 7A and 7B can be used in addition to the stripes of the comb-shaped electrode. A first electrode 3a can form triangular domain-inverted regions 9 periodically. The triangular periodically domain-inverted regions may be applied to a prism, a deflector, or the like. For the triangular shape, the domain-inverted regions can be made larger by arranging the symmetry axis along the Y-axis direction of the substrate crystals. In such a case, the vertex of a triangle serves as a tip, and domain inversion occurs and grows from the vertex.

Next, the effect of (c) applied electric field waveform on domain inversion is described below. When a direct-current voltage was applied between the electrodes to form fine domain-inverted regions of several μm, the resultant domain-inverted regions were significantly nonuniform. Specifically, the domain nuclei were created in several portions of the electrode, and the polarization was spread considerably from each of the nuclei and came into contact with the domain-inverted regions formed by the adjacent electrode fingers. Thus, the domain-inverted regions were not controlled precisely. When a pulse voltage having a pulse width of 0.1 ms to 100 ms and an applied voltage of about 8 kV/mm was applied, a fine domain-inverted structure was formed uniformly. A pulse electric field with a pulse width $\tau \leq 10$ msec was preferred as the applied electric field. Moreover, it was possible to provide a uniform domain-inverted structure by applying a plurality of pulse trains. When the applied voltage was 6 kV/mm or less, no domain-inverted region was formed.

Although the domain-inverted structure was provided by applying the pulse trains, the domain-inverted regions were formed only in the vicinity of the tips of the electrode fingers. Therefore, the domain-inverted regions did not extend along the electrode fingers to increase the length Lr. The result was the same when changing the pulse shape or pulse number. The optimum pulse number can be determined while observing the voltage waveform displayed by an oscilloscope. First, the voltage amplitude at the beginning of the voltage application is monitored, and additional pulses are applied. The voltage amplitude decreases with increasing the number of pulses, and then is stopped when the applied pulses reach a certain number. There is a correlation between the saturation of the voltage amplitude and the minimum applied pulse number. Accordingly, the applied pulse number can be determined by monitoring the decrease of the voltage amplitude. Even if more pulses than the certain number are applied, the domain-inverted regions do not expand. The minimum applied pulse number depends on the set current, and the number decreases when increasing the current value. In other words, when a domain-inverted structure is formed with the same period, the growth of domain inversion is stopped by the application of a smaller number of pulses as the current value becomes higher. Thus, even if more pulses than that number are applied, the domain-inverted regions do not expand.

Then, a direct-current voltage was applied in addition to a pulse voltage. The application time was about 1 to 100 sec. It was difficult to provide a uniform domain-inverted structure by applying only the direct-current voltage. However, when the direct-current voltage was applied consecutively after the pulse trains, the domain-inverted regions expanded along the electrode, and the length Lr was several times longer than the domain-inverted regions formed by applying only the pulses voltage. Thus, a fine uniform domain-inverted structure was formed in a wide range of the substrate by applying the direct-current voltage after the pulse trains. The desired result was achieved under the following conditions. The applied electric field pulse had, e.g., a pulse width of 0.5 ms and a pulse number of about 200 to 5000. The applied voltage was 5 to 6 kV for the substrate having a thickness of 2 mm. The maximum current value was about 0.2 to 1 mA. The direct-current voltage was considerably smaller than the pulse voltage, e.g., not more than 0.2 to 4 kV/mm. Even with such a very low voltage, domain inversion can occur. This is because the domain nuclei have been formed by applying the pulse trains, and the application of the direct-current voltage may contribute to expansion of the domain-inverted regions from the domain nuclei. When a direct-current voltage of 5 kV or more was applied after the pulse application, the domain-inverted regions became too large to be fine.

Next, the need for limiting the maximum values of a current and a voltage practically during voltage application will be described. As described above, when the polarization of MgLN or the like is inverted, the electric resistance of the substrate is reduced significantly. Therefore, a large current flows into the domain-inverted regions. In a general ferroelectric material, the flow of charge is very small and is restricted by the area of the domain-inverted regions. However, since a continuous current flows through the MgLN, special consideration should be given to a voltage circuit. Thus, it is necessary to have the function of controlling the maximum current flowing through the circuit to which an electric field is applied. For the MgLN, if the current value is not controlled, a large current flows and may cause crystal damage. To prevent this, a mechanism is required to reduce the applied voltage automatically so that the current value does not exceed the predetermined maximum value. The maximum current for the actual MgLN may depend on the electrode area, and preferably is 10 mA or less. In the case of a short-period structure of 3 μm or less, the current value should be controlled to 5 mA or less.

In applying the pulse train, it is useful to apply a pulse voltage so that the maximum current differs for each pulse. When a pulse electric field is applied any number of times to produce domain inversion, the domain-inverted regions have a high resistance in the early stages, and therefore a high voltage can be applied with a small amount of current. The maximum current should be set as a low current of 1 mA or less at the beginning of domain inversion, since increasing the amount of current may result in nonuniform domain-inverted regions. However, as the domain-inverted regions expand, the resistance of the domain-inverted regions decreases significantly. Therefore, if the maximum current value is limited, a voltage required for domain inversion cannot be obtained. Thus, it is useful to increase the maximum value of the applied current with expansion of the domain-inverted regions.

In the method for forming a domain-inverted structure of this embodiment, the thickness of the MgLN substrate is preferably 1 mm or more. When the thickness is 1 mm or more, the desired result can be achieved in both the uniformity of the domain-inverted structure and the length Lr of the domain-inverted regions under the electrode. This is because a thick substrate can prevent the domain-inverted regions from penetrating the substrate. As will be described later, if the domain-inverted regions penetrate the substrate, the nonuniformity of the domain-inverted regions is increased, thus making it difficult to provide a fine domain-inverted structure. By using the thick substrate, such penetration of the domain-inverted regions can be suppressed to provide a uniform domain-inverted structure. Conventionally, the formation of the domain-inverted regions has been facilitated by reducing the substrate thickness to 0.5 mm or less, thus providing a finer domain-inverted structure. The phenomenon in which the domain-inverted regions can be fine and uniform by increasing the substrate thickness is prominent particularly for a Mg-doped $LiTa_{(1-x)}Nb_xO_3$ ($0 \leq x \leq 1$) substrate. The polarization voltage of the Mg-doped $LiTa_{(1-x)}Nb_xO_3$ ($0 \leq x \leq 1$) substrate is not more than one-fourth that of a general LN. When the substrate thickness is increased, the general LN causes a dielectric breakdown due to the polarization voltage. However, the Mg-doped $LiTa_{(1-x)}Nb_xO_3$ ($0 \leq x \leq 1$) substrate uses a lower polarization voltage, so that the polarization voltage can be applied without causing any dielectric breakdown.

The above method of this embodiment uses the Z-plate MgLN to form a domain-inverted structure. In the Z-plate substrate, the C axis of the crystals is perpendicular to the substrate. Therefore, the electric field application utilizing an electrooptic effect can be performed efficiently. Moreover, the Z-plate substrate has the advantage of, e.g., increasing the depth of the domain-inverted regions, and is ideal for a bulk-type optical element. However, the same effect also was observed in an off-cut substrate, which is close to the Z plate. As an off-cut angle, the angle between a line perpendicular to the substrate plane and the C axis of the crystals was evaluated in the range of 0° or more. When the off-cut angle was not more than ±10°, a uniform domain-inverted structure comparable to that of the Z plate was formed. When the off-cut angle was more than ±10°, it was difficult to provide a fine uniform domain-inverted structure in the same manner.

In addition to MgLN with a congruent composition, the method for forming a domain-inverted structure of this embodiment also can be applied to a Mg-doped $LiTa_{(1-x)}Nb_xO_3$ ($0 \leq x \leq 1$) substrate or a Mg-doped $LiTa_{(1-x)}Nb_xO_3$ ($0 \leq x \leq 1$) substrate with a stoichiometric composition.

The doping amount of Mg and the domain inversion characteristics were evaluated using the MgLN with a congruent composition. The substrate thickness was 1 mm. The doping amount of Mg significantly affected the domain inversion characteristics. A change in electric resistance due to domain inversion increased with the doping amount of Mg. The formation of a short-period domain-inverted structure also depended on the doping amount of Mg. A short-period structure of 3 μm or less was formed only by the doping amount of Mg ranging from 4 to 5.5 μm. Along-period structure of 10 μm or more was formed even by the doping amount of Mg ranging from 2 to 7 mol %. When the doping amount is more than 7 mol %, the crystallinity is degraded, and domain inversion is not likely to occur. When the doping amount is less than 2 mol %, the lateral expansion of domain inversion is increased, thus making it difficult to provide a periodic structure. Therefore, the molar concentration is preferably in the range of 2 to 7 mol % to form a periodic structure, and more preferably in the range of 4 to 5.5 mol % to form a short-period structure.

For the composition of the substrate, the congruent composition was compared with the stoichiometric composition, and there was not a large difference in the relationship between the doping amount of Mg and the domain inversion characteristics. The MgLN, MgLT, and Mg-doped $LiTa_{(1-x)}Nb_xO_3$ ($0 \leq x \leq 1$) with a stoichiometric composition also indicated the same relationship between the doping amount of Mg and the domain inversion characteristics.

It turned out that the depth of domain-inverted regions to be formed significantly affected the uniformity of the domain-inverted regions. In a conventional method for forming a domain-inverted structure with a Z-plate MgLN substrate, the domain-inverted regions penetrate from the upper to the lower surface of the substrate. However, when a short-period domain-inverted structure, particularly having a period of 4 μm or less, is formed in the same manner, the nonuniformity is increased significantly. The domain-inverted regions formed in the MgLN have the rectification properties and allow a current to flow by the applied voltage that is not more than a voltage at which domain inversion occurs. Therefore, when a voltage is applied between the electrodes to produce domain inversion, part of the polarization is inverted and penetrates the substrate, and a current flows between the electrodes through the domain-inverted regions. Consequently, while the polarization grows largely in this portion, the growth of domain inversion is stopped in the other portions because the current has been flowing into the portion where the polarization is inverted and penetrates the substrate. Thus, the domain-inverted regions are significantly nonuniform.

In the case of domain inversion by direct-current application, it is difficult to form fine domain-inverted regions. The reason for this is the same as described above. The method for forming a domain-inverted structure of this embodiment allows domain inversion to occur by pulse application, and thus can control a domain-inverted depth D not to reach a substrate thickness T. In other words, the applied pulse number can be controlled so that the domain-inverted depth D does not reach the substrate thickness T, thereby limiting the proportion of penetration of the domain-inverted regions from the upper to the lower surface of the substrate. Thus, the uniformity of domain inversion can be improved. The experiment showed that the proportion of the area of the domain-inverted regions penetrating the substrate was suppressed to 1% to 50% of the total area of the domain-inverted regions, resulting in a uniform domain-inverted structure. When the proportion was reduced to 20% or less, a fine structure of 4 µm or less was formed easily. By applying a very low direct-current voltage after the pulse voltage, the domain-inverted regions expand from the domain nuclei formed by the pulse application along the electrode. Therefore, the domain-inverted depth D is not increased and can be maintained smaller than the substrate thickness T. As described above, the relationship of T>D is established in forming the domain-inverted regions, which makes it possible to provide a fine uniform domain-inverted structure.

To form fine domain-inverted regions uniformly by suppressing the growth of the domain-inverted regions penetrating the substrate, it is useful to control the mean value of the domain-inverted depth D to be 40% to 95% of the substrate thickness T. When the mean value is more than 95%, the proportion of penetration of the domain-inverted regions exceeds 50%, and the nonuniformity of domain inversion is increased significantly. When the mean value is less than 40%, there are many portions where no domain-inverted region is formed, resulting in a nonuniform domain-inverted structure. When the mean value is suppressed to 50% to 80% of the substrate thickness T, the uniformity can be improved further.

For precise control of domain inversion, it is useful to change the crystallinity of the surface of the MgLN substrate by ion exchange. When an electric field is applied to the MgLN by the pattern electrode, the surface state of the substrate significantly affects the domain inversion characteristics. The application of a voltage using the electrode allows the domain-inverted regions not only to grow directly under the electrode, but also to expand in the lateral direction. The laterally expanded domain-inverted regions are not likely to be fine. For example, when a periodically domain-inverted structure is formed, the lateral expansion of the domain-inverted regions makes it difficult to achieve a short-period structure. To prevent this, it is useful to suppress the generation of domain nuclei. The domain nuclei are created in the crystal surface directly under the electrode and in the vicinity thereof. The domain-inverted regions grow from these nuclei. The generation of the domain nuclei can be reduced by performing ion exchange of the crystal surface to degrade the ferroelectricity of the crystal. For example, when proton exchange (a kind of ion exchange) is performed, the lateral expansion of the domain-inverted regions can be suppressed to provide a short-period domain-inverted structure. However, if the ion exchange depth is excessively deep, it becomes difficult to form the domain-inverted regions. Therefore, the ion exchange depth is preferably 0.5 µm or less.

Figure 8A:
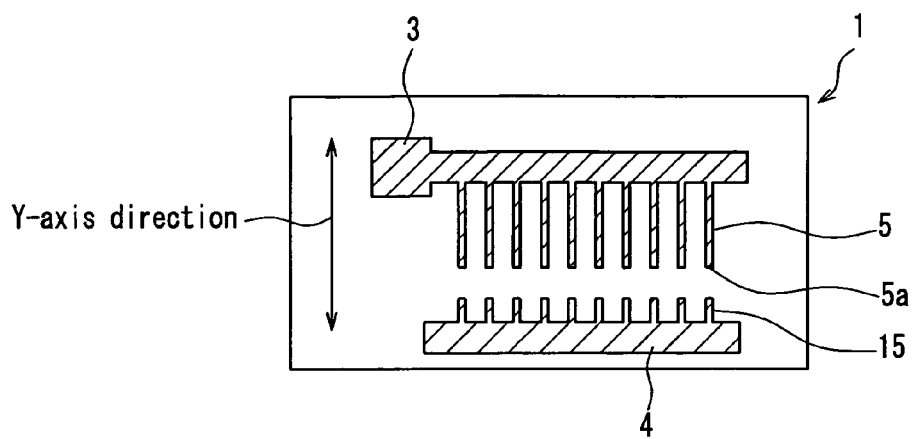
FIG. 8A is a plan view showing a method for forming a domain-inverted structure of the present invention.
Figure 8B:
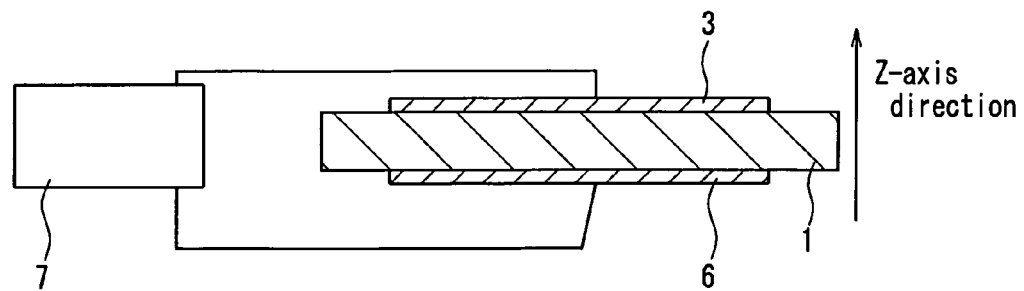
FIG. 8B is a cross-sectional view of FIG. 8A.

As shown in FIGS. 8A and 8B, the second electrode 4 may have comb-shaped electrode fingers 15. This configuration can improve the yield of formation of the domain-inverted regions. When a voltage is applied between the first electrode 3 and the counter electrode 6, an electric discharge is generated between the first electrode 3 and the second electrode 4, and in some cases domain inversion does not occur. This has been the cause of a lower yield of formation of the domain-inverted regions. The second electrode 4 having the comb-shaped electrode fingers similar to those of the first electrode 3 can prevent an electric discharge between the electrodes, and also can improve the yield.

It turned out that domain inversion occurred in the lower portion of the first electrode 3 by applying a voltage between the second electrode 4 and the counter electrode 6. When a distance between the second electrode 4 and the first electrode 3 is reduced, and a pulse voltage is applied to the second electrode 4, domain-inverted regions are formed in the lower portion of the first electrode 3. The domain-inverted regions thus formed are uniform and do not penetrate the substrate. Thus, a fine domain-inverted structure can be formed uniformly. Moreover, the application of a voltage to each of the first electrode 3 and the second electrode 4 is repeated, so that the domain-inverted structure can be made finer and longer.

Figure 9A:
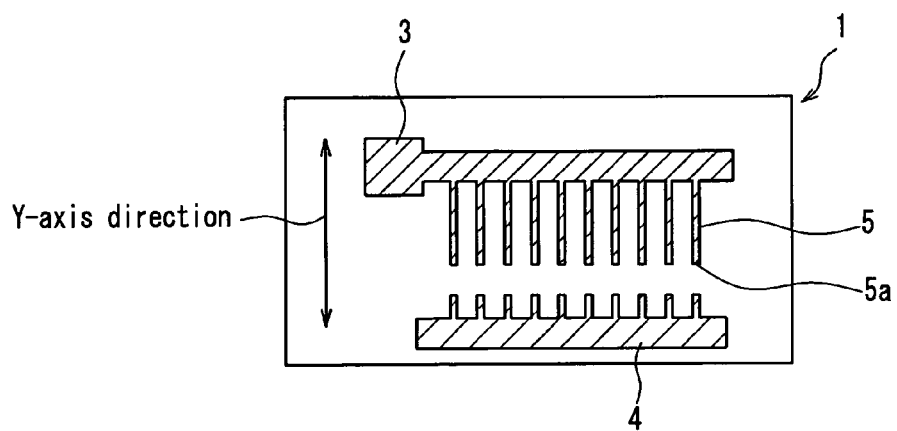
FIG. 9A is a plan view showing a method for forming a domain-inverted structure of the present invention.
Figure 9B:
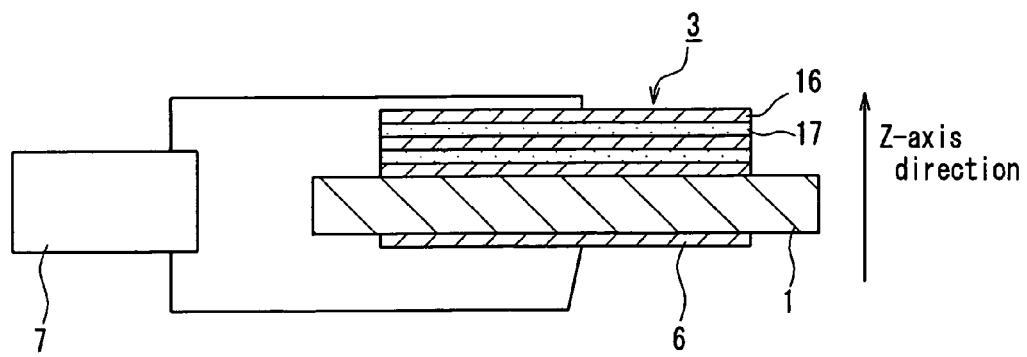
FIG. 9B is a cross-sectional view of FIG. 9A.

As shown in FIGS. 9A and 9B, at least one of the first electrode 3 and the second electrode 4 may be formed as a multilayer structure of a metal 16 and a dielectric 17. This configuration can improve the uniformity of domain inversion and expand the domain-inverted regions formed under the electrode. The reason for this is that when a pulse voltage is applied between the electrodes, the electrode capacitance is increased to cause a change in transient properties of the pulse shape. The electrode in the form of a multilayer layer of metal and dielectric is effective in increasing the electrode capacitance. Preferred examples of the dielectric include $SiO_2$, $Ta_2O_5$, $Nb_2O_5$, and other materials with a high dielectric constant.

EMBODIMENT 2

A method for forming a domain-inverted structure in Embodiment 2 is relates to an improvement to stabilize domain inversion. First, the experiment demonstrating the instability of domain inversion in MgLN is described below.

In the experiment, a Mg-doped (5 mol) $LiNbO_3$ substrate of a Z plate was used. An electrode was formed on the ±Z planes of the 1 mm thick substrate. A pulse voltage of about 10 kV was applied so as to form domain-inverted regions under the electrode. The substrate was etched with a HF solution, and the domain-inverted regions were observed by a difference in etching rate of the ±Z planes.

Next, the substrate provided with the domain-inverted regions was heat-treated at about 100° C. for 30 minutes, followed by HF etching treatment. Thereafter, the domain-inverted regions were observed. The observation confirmed that the area of the domain-inverted regions was reduced nearly by half. The observation also showed the following:

(1) the domain-inverted regions were reduced even by heat treatment at a low temperature of about 80° C.;

(2) the domain-inverted regions were reduced with temperature and time of the heat treatment;

(3) the domain-inverted regions were reduced even by the application of an electric field with a low voltage;

(4) a reduction in the domain-inverted regions occurred nonuniformly; and (5) the same phenomena also were observed by using an off-cut substrate in which the C axis of the crystals slightly tilts from a normal to the substrate surface.

As is evident from the above description, the domain-inverted structure formed by the electric filed application is significantly unstable in the Z-plate MgLN. This may lead to the following problems.

The domain-inverted regions are reduced at a very low temperature. Therefore, the substrate provided with the domain-inverted regions cannot be processed by a process involving heating. Moreover, the domain inversion varies with time, and thus the element properties change with time.

The method for forming a domain-inverted structure of this embodiment can solve the above problems, and is characterized in that annealing is performed after the domain-inverted regions have been formed by the application of an electric field, while the substrate and the electrode structure may be the same as those in Embodiment 1. It is possible to suppress a reduction in the domain-inverted regions by appropriately setting the conditions of annealing after the formation of the domain-inverted regions.

Figure 10A:
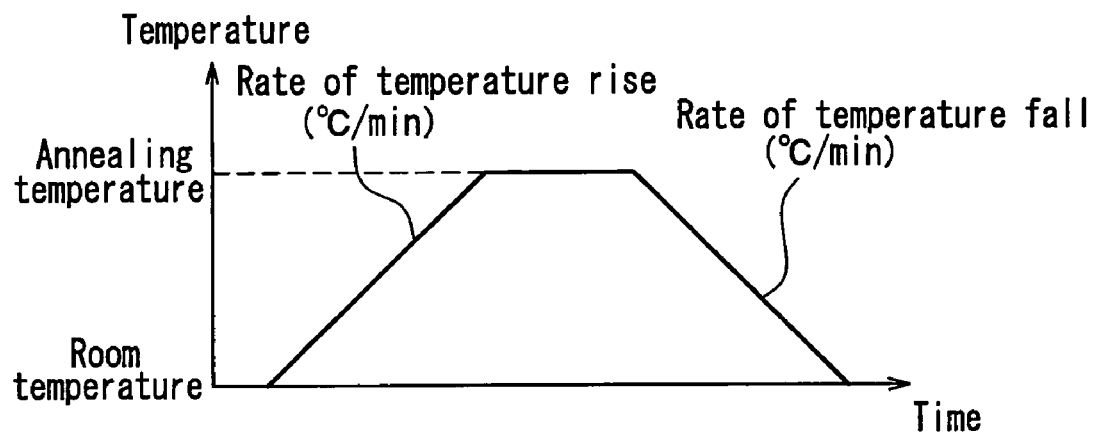
FIG. 10A shows an annealing temperature curve for explaining the cause and effect of the stability of domain-inverted regions.
Figure 10B:
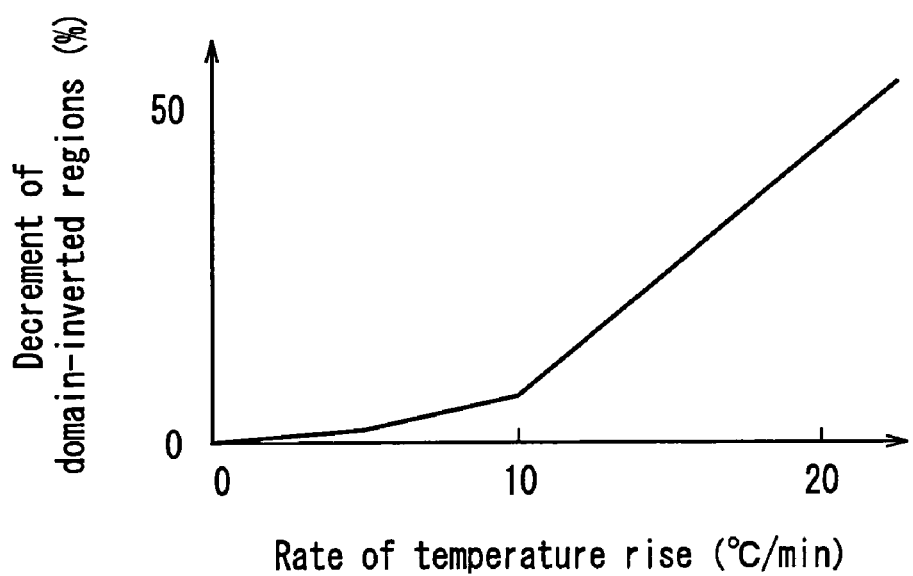
FIG. 10B shows the relationship between the rate of temperature rise and the decrement of domain-inverted regions.

The study on the appropriate annealing conditions showed that a reduction in the domain-inverted regions significantly depends on the rate of temperature rise of annealing. FIG. 10A shows an annealing temperature profile. After the substrate reaches the annealing temperature at a constant rate of temperature rise, annealing is performed at 100° C. for 1 hour, and then the substrate is cooled to room temperature at a constant rate of temperature fall. FIG. 10B shows the result of measurement on the relationship between a rate of temperature rise of annealing and a decrement of the domain-inverted regions. As can be seen from FIG. 10B, the decrement of the domain-inverted regions increases with the rate of temperature rise. When the rate of temperature rise is more than 20° C./min, the domain-inverted regions are reduced by 50% or more. In contrast, when the rate of temperature rise is 10° C./min or less, the decrement is 10% or less. When the rate of temperature rise is 5° C./min or less, the decrement is several %. Therefore, the rate of temperature rise is preferably 10° C./min or less, and more preferably 5° C./min or less to suppress a reduction in the domain-inverted regions. The same experiment was conducted on the rate of temperature fall and showed that the rate of temperature fall hardly affected a reduction in the domain-inverted regions. This is because an electric field due to a pyroelectric charge generated during the temperature rise may affect the stability of domain inversion.

It became clear that the instability of the domain-inverted regions resulted from a reinversion phenomenon of the inverted domains caused by the pyroelectric charge. Therefore, another method was studied to solve this problem. For the Z-plate substrate, the pyroelectric charge appears on the upper and the lower surface of the substrate and produces an electric field in the Z-axis direction. To prevent this, the upper and the lower surface of the substrate may be short-circuited electrically. A metallic paste was applied to the upper and the lower surface of the substrate provided with the domain-inverted regions, and then the upper and the lower surface of the substrate were short-circuited electrically. Thereafter, the substrate was annealed. The annealing temperatures were 400° C., 600° C., and 800° C. For the MgLN, although the domain-inverted regions were reduced at 800° C., the stability of domain inversion was ensured even with any high-speed heat treatment at 600° C. or less. Thus, when the upper and the lower surface of the substrate are short-circuited to eliminate the electric field due to the pyroelectric charge, high-speed annealing can be performed.

The annealing at 200° C. or more significantly improved the stability of the domain-inverted structure. After annealing was performed at 200° C. or more, the inverted shape was not changed at all by repeating high-speed temperature rise and fall experiments at 100° C. or more.

Moreover, the scattering loss in the substrate was reduced significantly by heat treatment at 400° C. or more, resulting in a domain-inverted structure with high transparency. For example, when the domain-inverted structure was applied to an optical wavelength conversion element utilizing a non-linear optical effect, the conversion efficiency was increased considerably. When the domain-inverted structure was applied to a polarizer, the propagation loss was reduced by more than half. Therefore, it was possible to achieve a low-loss polarizer.

The instability of the domain-inverted structure is due to the fact that the polarization electric field of the MgLN is 5 kV/mm or less, which is one-fourth or less that of a general $LiNbO_3$, $LiTaO_3$, or the like. Because of a low polarization voltage, the inverted domains are not stable and susceptible to reinversion by a small pyroelectric effect. The polarization voltage also is low for the stoichiometric crystals, and thus heat treatment is required in the same manner. The upper limit of the heat treatment temperature depends on the Curie temperature of the substrate. The MgLN has a Curie temperature of about 1200° C. Therefore, the heat treatment temperature should be 800° C. or less. When it is more than 800° C., the domain-inverted regions are reduced. The Curie temperature of $LiTaO_3$ is about 600° C., and the upper limit of the heat treatment temperature is 500° C. or less.

The heat treatment of this embodiment is effective particularly for the domain-inverted structure formed by the method of Embodiment 1. However, it also can be used to stabilize the domain-inverted structure formed by other methods.

EMBODIMENT 3

Figure 11A:
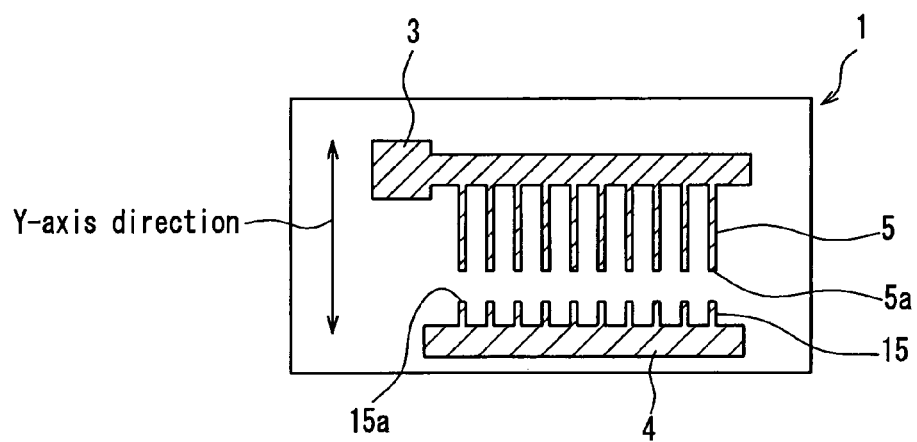
FIG. 11A is a plan view showing a method for forming a domain-inverted structure in Embodiment 3.
Figure 11B:
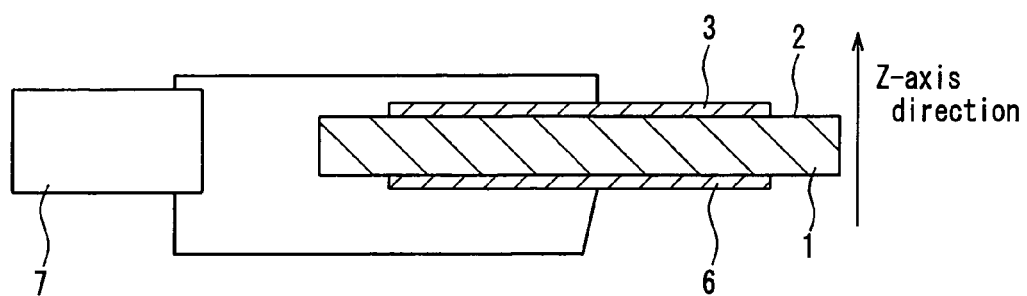
FIG. 11B is a cross-sectional view of FIG. 11A.

A method for forming a domain-inverted structure in Embodiment 3 is characterized by a voltage application process for the electrode structure as shown in FIGS. 11A and 11B. In this embodiment, a MgLN substrate 1 has a principal surface 2 perpendicular to the Z axis. A first electrode 3 and a second electrode 4 are formed on the + Z plane of the MgLN substrate 1, and a voltage is applied using the first electrode 3 and the second electrode 4. In other words, when a voltage is applied to one of the electrodes, the domain-inverted regions also are formed under the other electrode. Thus, the domain-inverted regions can be formed in a wide range of the substrate. An example of forming the domain-inverted regions in the Z-plate MgLN substrate having a thickness of 1 mm is described below.

In FIGS. 11A and 11B, the identical elements to those in Embodiment 1 are denoted by the same reference numerals, and the explanation will not be repeated. In this embodiment, a plurality of electrode fingers 5 constituting the first electrode 3 are arranged at a predetermined period so that the symmetry axis of each stripe is aligned with the Y-axis direction of crystals of the MgLN substrate 1. Therefore, the tips 5a extend from the bases of the electrode fingers 5 in the Y-axis direction. The second electrode 4 also has the comb-shaped electrode fingers 15, and the tips 15a extend from the bases of electrode fingers 15 in the Y-axis direction.

A voltage controlled by the pulse generator 7 is applied between the first electrode 3 and the counter electrode 6 that is provided on the other side of the substrate, and thus domain-inverted regions are formed between the electrodes. If necessary, a pulse voltage or direct-current voltage having a predetermined voltage level can be applied to the MgLN substrate 1. To avoid the generation of electric discharge during the voltage application, the MgLN substrate 1 is placed in an insulating liquid or vacuum ($10^{-6}$ Torr or less), and then a voltage is applied to the substrate 1.

A voltage application process peculiar to this embodiment is described below. First, a pulse voltage is applied between the second electrode 4 and the counter electrode 6, followed by a direct-current voltage. Similarly, a pulse voltage is applied between the first electrode 3 and the counter electrode 6, followed by a direct-current voltage. Thus, domain nuclei are generated under the tips 5a of the first electrode 3 and the tips 15a of the second electrode 4, and domain inversion occurs.

The reason that the application of a voltage to one of the first and second electrodes 3, 4 allows the domain inversion to occur under the other electrode is described below.

To examine the effect of the voltage applied to the second electrode 4 on the portion under the first electrode 3, the state of domain inversion in the ferroelectric substrate was evaluated after a pulse voltage was applied between the second electrode 4 and the counter electrode 6, while no voltage was applied to the first electrode 3. The distance between the tips 5a of the first electrode 3 and the tips 15a of the second electrode 4 was 400 μm. After applying the voltage, the substrate was etched with a heated fluoronitric acid solution, and domain inversion under the first electrode 3 was observed. The observation confirmed that the domain-inverted regions were formed under the first electrode 3 to which no voltage had been applied. Similarly, when a voltage was applied to the first electrode 3, and no voltage was applied to the second electrode 4, the domain-inverted regions also were formed under the second electrode 4.

Figure 12:
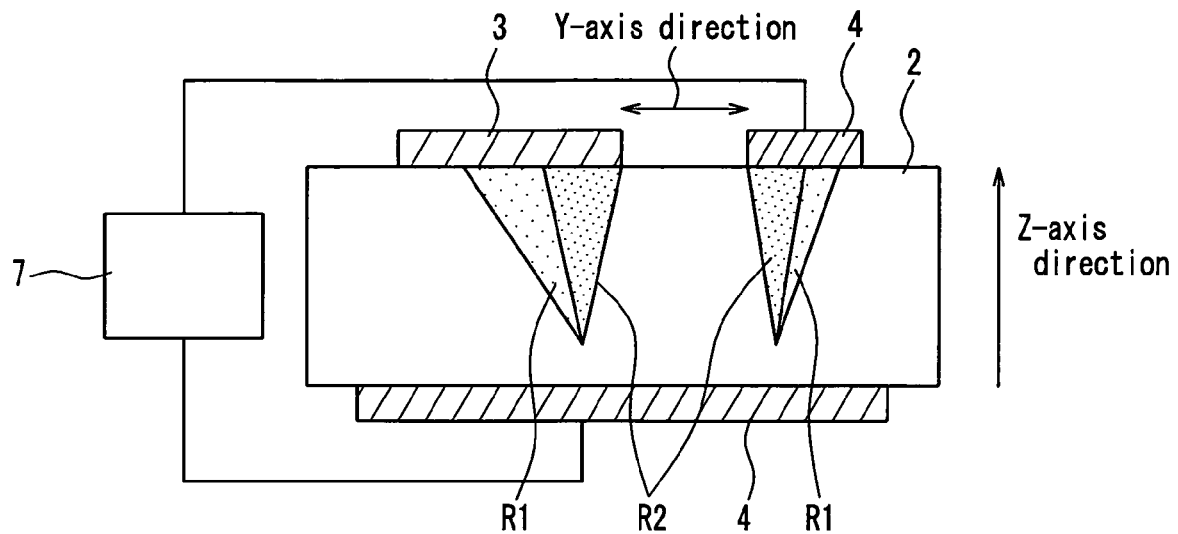
FIG. 12 is a cross-sectional view showing the state of formation of domain-inverted regions in first and second electrodes in Embodiment 3.

This feature is described in more detail by referring to FIG. 12. FIG. 12 is a cross-sectional view showing the state of formation of the domain-inverted regions. When a voltage is applied to the second electrode 4, domain-inverted regions R2 are formed under the second electrode 4 and the first electrode 3. Subsequently, when a voltage is applied to the first electrode 3, the domain-inverted regions under the first and second electrodes grow further and result in domain-inverted regions R1. This indicates that the domain-inverted regions can be expanded by arranging two electrodes on the same plane and applying a voltage to either of the electrodes.

Next, the evaluation was conducted by changing the following conditions so as to expand the domain-inverted regions formed under the first electrode 3.

(a) voltage application process
(b) distance between electrodes
(c) electrode direction and crystal axis
(d) voltage waveform and charge amount
(e) shape of the second electrode 4
(f) temperature of insulating solution First, (a) voltage application process is described. As the voltage application process, simultaneous application (a voltage is applied to the first and second electrodes 3, 4 simultaneously) and individual application (a voltage is applied to the first and second electrode 3, 4 individually) were studied. In the simultaneous application, the amount of current flowing near the + Z plane was increased, and a large current was likely to flow into the same plane of the first electrode 3 and the second electrode 4, so that there was a very high possibility of electric discharge. Thus, the individual application is preferred for the voltage application process. The individual application is described below.

When an electric field is applied to the first and second electrodes 3, 4 simultaneously, the electric field concentrated on the tips of each of the electrodes is reduced. This may interfere with the growth of the domain-inverted regions. Therefore, it is effective to apply the electric field individually in the early stages of the electric field application. Moreover, when the electric field is applied by one of the adjacent electrodes, domain inversion also occurs under the electrode to which no voltage has been applied. Based on this action, the electric field can be applied alternately by the adjacent electrodes, thus further expanding the domain-inverted regions formed under the respective electrodes. Moreover, the domain-inverted regions can be made longer by the alternate application than by the application of an electric field using a single electrode. In the experiment, e.g., when the distance between the electrodes was 200 μm, the length of the domain-inverted regions formed by applying an electric field to a single electrode was about 2 times as long as that of the domain-inverted regions formed by applying a voltage to the first and second electrodes 3, 4 simultaneously. With the alternate application, the length Lr of the domain-inverted regions was about 1.5 times longer than that of the single electrode application, and about 3 times longer than that of the simultaneous application.

The application of an electric field alternately between the first and second electrodes was effective particularly in applying a pulse electric field. Moreover, the domain-inverted regions formed under the electrode to which an electric field is applied later tend to increase the length Lr as compared with the electrode to which an electric field is applied before. Therefore, it is useful to apply an electric field to the main electrode later.

When a direct-current electric field is applied after a pulse electric field, there is no effect of the alternate application. The process can be shortened by applying an electric field to the adjacent electrodes simultaneously. Moreover, the domain-inverted structure can be uniform as a whole. It is effective to apply the direct-current electric field to a plurality of electrodes simultaneously after the application of the pulse electric field.

Thus, as a preferred example, the electric field is applied by a first electric field application process of applying a voltage between the first electrode 3 and the counter electrode 6, and a second electric field application process of applying a voltage between the second electrode 4 and the counter electrode 6. The first electric field application process applies a pulse voltage with a field intensity of E1 and a pulse width of $\tau \leq 10$ msec. The second electric field application process applies a direct-current voltage with a field intensity of E2 and a pulse width of $\tau \geq 1$ sec. E1 and E2 satisfy E1>E2.

Figure 13:
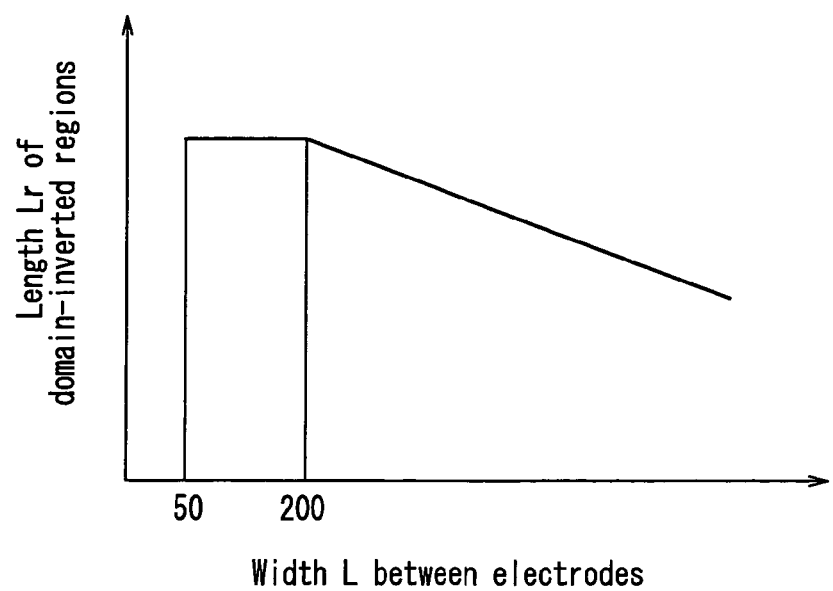
FIG. 13 shows the relationship between the distance L between the first and second electrodes and the length Lr of the domain-inverted regions in Embodiment 3.

Next, (b) distance between electrodes is described. FIG. 13 shows the relationship between the distance L between the tips 5a of the first electrode 3 and the tips 15a of the second electrode 4 and the length Lr of the domain-inverted regions formed under the first electrode 3. As can be seen from FIG. 13, the length Lr increases when decreasing the distance L between the first and second electrodes 3, 4. The length Lr starts to be saturated when the distance L is close to 200 μm. Therefore, the distance L is preferably 200 μm or less. When the distance L is too short ($L \leq 50$ μm), the possibility of electric discharge is increased. In this embodiment, the desired result was achieved by setting the distance L between the first and second electrodes 3, 4 to L=200 μm.

With respect to (c) electrode direction and crystal axis, the explanation is the same as in Embodiment 1.

Next, (d) voltage waveform and charge amount will be described. With respect to the voltage waveform, the explanation is the same as in Embodiment 1. The study on the amount of charge applied to the electrode is as follows. The application of excess charge to the second electrode 4 is effective in expanding the domain-inverted regions under the first electrode 3. For the second electrode 4, the appropriate charge amount C is expressed by C=2Ps×A where Ps is spontaneous polarization and A is a domain-inverted area. By applying the amount of charge at least 100 times larger than the appropriate charge amount C, the domain-inverted regions under the first electrode 3 is expanded, and the length Lr is increased significantly. At this time, excessive charge is being applied to the second electrode 4, and domain inversion occurs over the entire surface under the second electrode 4. Thus, the periodic domain inversion in the form of a comb has been obliterated.

Next, (e) shape of the second electrode 4 is described. As an effective shape of the second electrode 4, the tips 15a extend from the bases of the electrode fingers 15 in the Y-axis direction. However, the second electrode 4 is used as a dummy electrode for expanding the domain-inverted regions under the first electrode 3. Therefore, the second electrode 4 may have other shapes as long as the domain-inverted regions under the first electrode 3 are expanded by the application of an electric field. In fact, even if a rectangular electrode is used as the second electrode 4, the domain-inverted regions under the first electrode 3 are expanded by the application of an electric field to the second electrode 4.

Figure 14:
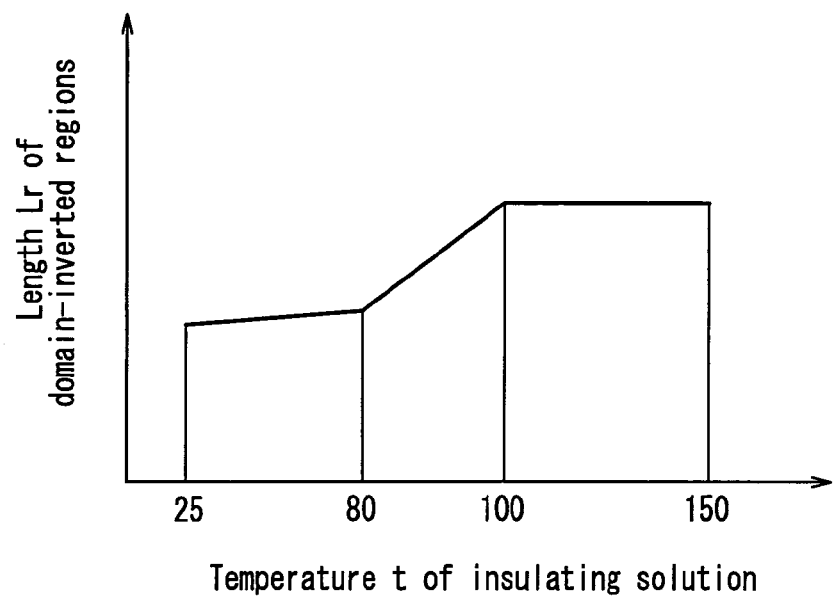
FIG. 14 shows the relationship between the temperature of an insulating solution and the length Lr of the domain-inverted regions in Embodiment 3.

Next, (f) temperature of insulating solution will be described. To prevent a dielectric breakdown during the application of an electric field, it is preferable that the electric field is applied in the insulating solution. FIG. 14 shows the relationship between the temperature of the insulating solution and the length Lr of the domain-inverted regions. As can be seen from FIG. 14, the domain-inverted regions start to increase at near 80° C., and the length Lr of the domain-inverted regions is saturated at 100° C. or more. With a rise in temperature of the MgLN substrate, the polarization electric field is decreased, and domain inversion may grow easily. When the temperature is 150° C. or more, the growth of domain inversion in the periodic direction becomes prominent. Thus, it is difficult to form a uniform domain-inverted structure with a short period of 5 μm or less. Therefore, the temperature of the insulating solution is preferably 150° C. or less for short-period domain inversion. This condition also is applied to the method of Embodiment 1.

According to the method for forming a domain-inverted structure in view of the above conditions, a short-period (10 μm or less) uniform domain-inverted structure was formed in the 1 mm thick Z-plate MgLN substrate with a large domain-inverted area. In the method of this embodiment, the desired result was achieved when the thickness of the MgLN substrate was 1 mm or more. Specifically, the uniformity of the domain-inverted regions and the length Lr of the domain-inverted regions under the electrode were improved with a substrate thickness of 1 mm or more. This is because a thick substrate can prevent the domain-inverted regions from penetrating the substrate.

Figure 15:
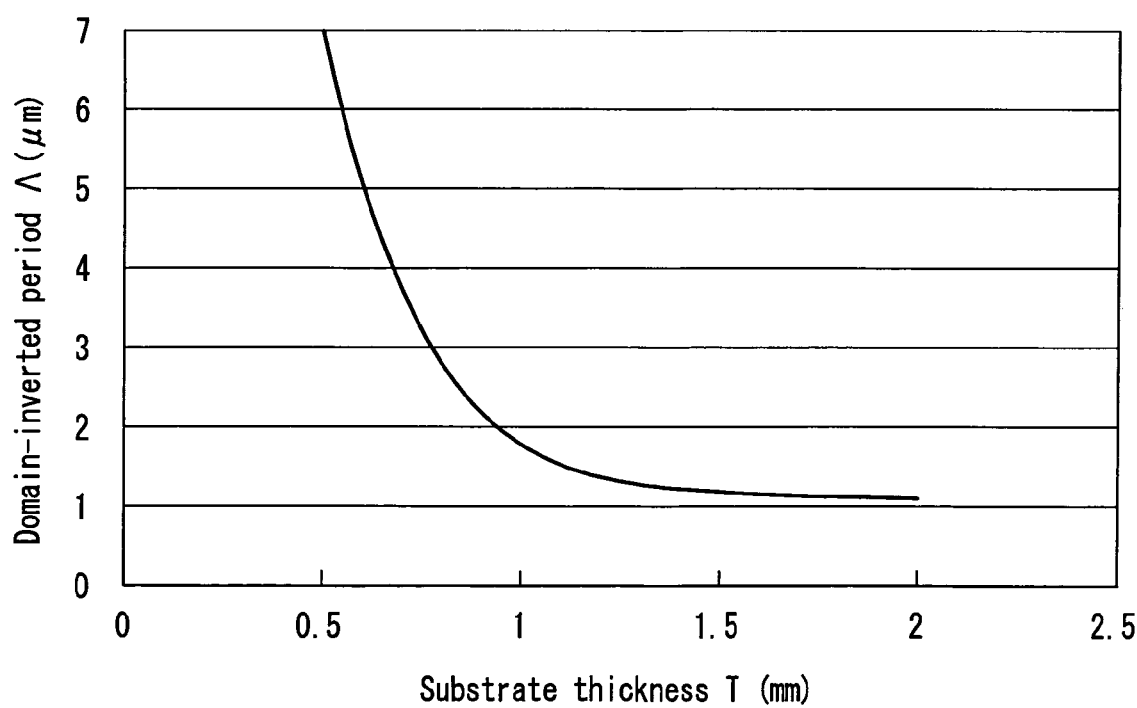
FIG. 15 shows the relationship between a substrate thickness and a domain-inverted period in Embodiment 3.

FIG. 15 shows the relationship between the substrate thickness T and the domain-inverted period Λ at which domain inversion can occur. When the substrate thickness is 0.5 mm, it is very difficult to produce the periodic domain inversion of 7 μm or less. By increasing the substrate thickness, fine domain inversion can occur. As will be described later, when the domain-inverted regions penetrate the substrate, the nonuniformity of the domain-inverted regions is increased, thus making it difficult to provide a uniform domain-inverted structure. The thick substrate can suppress penetration of the domain-inverted regions, so that uniform domain-inverted regions can be formed. Conventionally, the substrate thickness has been reduced to 0.5 mm or less so as to form domain-inverted regions, thus providing a finer domain-inverted structure. The method for improving uniformity and fineness of the domain-inverted regions easily by increasing the substrate thickness is effective particularly for a Mg-doped LiTa$_{(1-x)}$Nb$_x$O$_3$ ($0 \leq x \leq 1$) substrate.

EMBODIMENT 4

Figure 16A:
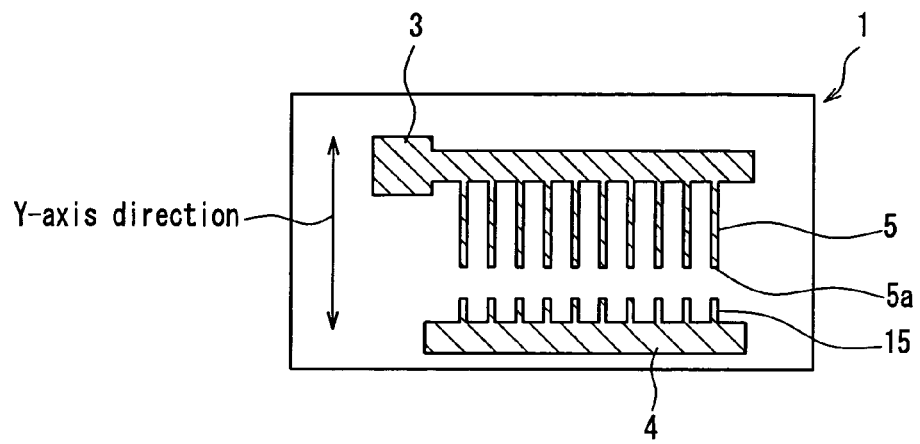
FIG. 16A is a plan view showing a method for forming a domain-inverted structure in Embodiment 4.
Figure 16B:
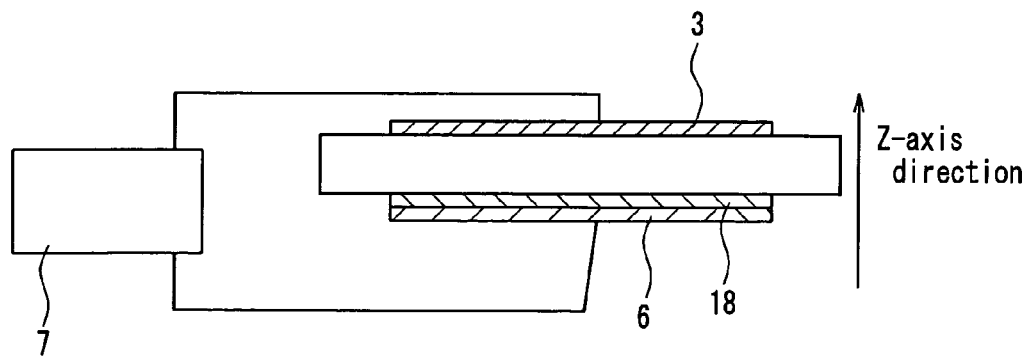
FIG. 16B is a cross-sectional view of FIG. 16A.

A method for forming a domain-inverted structure in Embodiment 4 will be described with reference to FIGS. 16A and 16B. The electrode structure of this embodiment is the same as that of Embodiment 3, except that a SiO$_2$ layer is sandwiched between the −Z plane of the MgLN substrate 1 and the counter electrode 6 as an insulating layer 18. A low-frequency pulse voltage is applied between the electrodes, so that domain-inverted regions are formed widely under the electrode that is provided on the + Z plane.

As described in Embodiment 3, the MgLN has peculiar rectification properties. When part of the polarization is inverted and penetrates the MgLN substrate 1, a current flows into this portion, and the polarization grows larger than in the other portions. Consequently, a desired voltage is not applied throughout the MgLN substrate 1, and thus the growth of the domain-inverted regions is stopped, or the domain inversion becomes nonuniform. In particular, such nonuniformity is increased significantly in forming a domain-inverted structure having a period of 4 μm or less.

To prevent the polarization from penetrating from the upper to the lower surface of the MgLN substrate 1, and to improve the uniformity of short-period domain-inverted regions or to expand the domain-inverted regions, the SiO$_2$ layer is sandwiched between the −Z plane and the counter electrode 6 and serves as the insulating layer 18 in this embodiment. By sandwiching an insulator between the electrodes, it is possible to increase the electrode capacitance, to improve the uniformity of domain inversion, and to expand the domain-inverted regions formed under the electrode. JP 7(1995)-281224 discloses a structure in which an insulator is sandwiched between electrodes. This document also discloses that the application time is set to 3 seconds so that the domain-inverted regions having a period of 5 μm penetrate from the upper to the lower surface of the 0.3 mm thick substrate.

When a short-period domain-inverted structure is formed in the substrate with a thickness of 1 mm or more, it is very important to prevent the penetration of polarization in the substrate. The penetration of polarization significantly depends on the pulse width of a pulse voltage to be applied. Therefore, the applied pulse shape was studied. First, a pulse shape with a pulse width τ of 10 to 100 sec was applied. However, even if the current value was low, periodic domain inversion did not occur, and an electric discharge or a phenomenon in which the polarization was inverted over the entire surface was observed. This is attributed to a long applied pulse width. When applying a pulse shape with the same pulse width (1 msec) as that has been used conventionally, the domain-inverted regions did not expand even by increasing the pulse number and the current.

Figure 17:
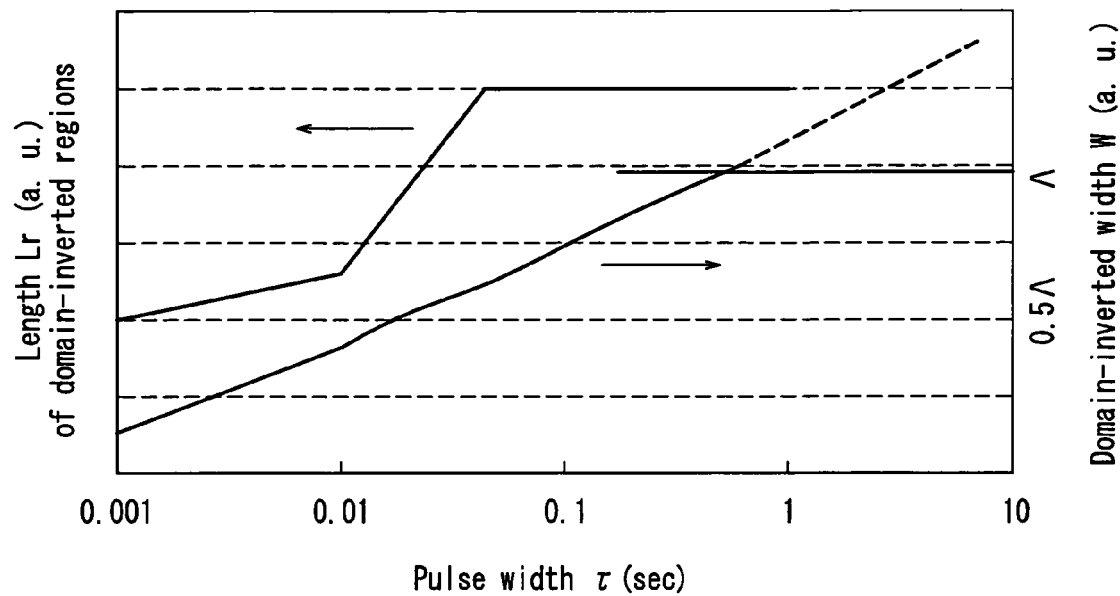
FIG. 17 shows the relationship between the pulse width of an applied voltage and the length Lr of the domain-inverted regions in Embodiments 3 and 4.

After optimization of the pulse width, it was confirmed that the domain-inverted regions expanded while the pulse width τ was in the range of 1 msec to 50 msec, as shown in FIG. 17. In particular, the domain-inverted regions expanded significantly with a pulse width of 10 msec to 50 msec. Moreover, when a domain-inverted width W was about 0.5 Λ (Λ represents a domain-inverted period), the duty ratio was close to 50%, and the highest efficiency was achieved. When the pulse width was 1 sec or more, the domain inversion grew excessively in the width direction, resulting in W=Λ. The width of the domain-inverted regions was larger than the period, and thus a domain-inverted structure was not provided.

The expansion of the domain-inverted regions in using a 2 mm thick MgLN substrate was studied. The result also showed the dependence of the domain inversion characteristics on the pulse width. That is, the domain-inverted regions having a period of 4 µm expanded with a pulse width of 10 msec to 2 sec.

In this embodiment, a $TiO_2$ layer, a $Ta_2O_5$ layer, a $Nb_2O_5$ layer, or the like can be used as the insulating layer in addition to the $SiO_2$ layer.

EMBODIMENT 5

In a method for forming a domain-inverted structure of Embodiment 5, a Si layer is used as a semiconductor layer, instead of a $SiO_2$ layer used as the insulating layer 18 in the electrode structure of Embodiment 4. The Si layer (semiconductor layer) is sandwiched between the – Z plane and the counter electrode 6, thereby increasing the electrode capacitance and preventing the polarization from penetrating the substrate. This can improve the uniformity of domain inversion and expand the domain-inverted regions formed under the electrode.

Based on this embodiment using the semiconductor layer, the applied pulse shape was studied. First, a pulse shape with a pulse width τ of 10 to 100 sec was applied. However, even if the current value was low, periodic domain inversion did not occur, and an electric discharge or a phenomenon in which the polarization was inverted over the entire surface was observed. This is attributed to a long applied pulse width. When applying a pulse shape with the same pulse width (1 msec) as that has been used conventionally, the domain-inverted regions did not expand even by increasing the pulse number and the current. After optimization of the pulse width, it was confirmed that the domain-inverted regions expanded while the pulse width was in the range of 10 msec to 1 sec. In particular, the domain-inverted regions expanded significantly with a pulse width of 20 msec to 50 msec.

The expansion of the domain-inverted regions in using a 2 mm thick MgLN substrate was studied. The result also showed the dependence of the domain inversion characteristics on the pulse width. That is, the domain-inverted regions having a period of 4 µm expanded with a pulse width of 10 msec to 2 sec.

In this embodiment, a ZnSe layer, a GaP layer, or the like can be used as the semiconductor layer in addition to the Si layer.

EMBODIMENT 6

Figure 18:
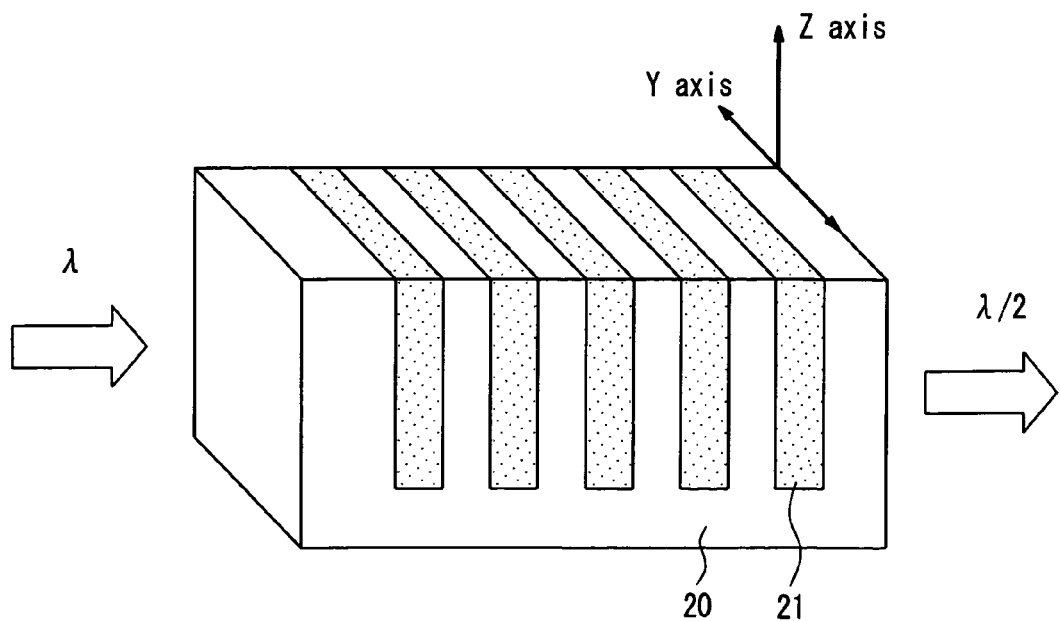
FIG. 18 is a perspective view showing an optical element in Embodiment 6.

An optical element of Embodiment 6 can be produced by using the method for forming a domain-inverted structure of each of the above embodiments. A wavelength conversion element will be described with reference to FIG. 18 as an example of the optical element of this embodiment. FIG. 18 is a perspective view of the wavelength conversion element. Periodically domain-inverted regions 21 are formed in a Z-plate MgLN substrate 20. A fundamental having a wavelength λ can be converted into a harmonic having a wavelength λ/2 by wavelength conversion using the periodically domain-inverted structure. The domain-inverted period is, e.g., 4 µm, and light with a wavelength of 900 nm can be converted into light with a wavelength of 450 nm. The thickness of the substrate 20 is e.g., 1 mm and the depth of the domain-inverted regions 21 is about 0.8 mm. The domain-inverted regions 21 extend along the Y axis of crystals of the substrate. The domain-inverted regions 21 also are formed from the + Z plane toward the – Z plane of the substrate 20. Most of the domain-inverted regions 21 have a depth smaller than the thickness of the substrate 20. Although part of the domain-inverted regions 21 can penetrate the substrate 20, an area of the domain-inverted regions 21 penetrating the substrate is not more than 50% of a total area of the domain-inverted regions 21.

When the domain-inverted regions 21 were formed over a length of 10 mm in the X-axis direction, and light having a wavelength of 900 nm entered the substrate through a lens, the wavelength was converted with a conversion efficiency of 5%/W, and a 450 nm harmonic was obtained. The result showed that high-efficiency wavelength conversion was performed by forming uniform domain-inverted regions. When the thickness of the substrate 20 is 1 mm or more, the beam waist of the fundamental and the harmonic is increased. Thus, it is possible to reduce the power density of light and to achieve a high output. The use of the 1 mm thick substrate can provide an output four times higher than that of a 0.5 mm thick substrate in which the domain-inverted regions are formed.

The domain-inverted regions 21 are formed in the Y-axis direction, thereby providing a short-period uniform domain-inverted structure. The domain-inverted structure may have a period of 2 µm or less, which makes it possible to generate ultraviolet light having a wavelength of 400 nm or less. Thus, short-wavelength light can be generated by forming the domain-inverted regions 21 in the Y-axis direction. In contrast, when the domain-inverted regions 21 are formed in the X-axis direction, it is difficult to provide a short-period domain-inverted structure, and only light having a wavelength of 500 nm or more is generated.

Moreover, the depth of the domain-inverted regions is smaller than the thickness of the substrate, and an area of the domain-inverted regions penetrating the substrate is suppressed to 50% or less, thereby providing a uniform domain-inverted structure. When the proportion of the domain-inverted regions penetrating the substrate is 1% to 50%, the domain-inverted regions can be uniform. When the proportion is less than 1%, the instability of the domain-inverted structure is increased, and the domain-inverted regions vary with time. When the proportion is more than 50%, it is difficult to provide a short-period domain-inverted structure. Therefore, the wavelength conversion element thus produced cannot generate a second harmonic having a wavelength of 500 nm or less. By limiting the proportion of the domain-inverted regions penetrating the substrate, uniform domain-inverted regions can be formed at a domain-inverted period of 3 µm or less, and ultraviolet light having a wavelength of 400 nm or less can be generated.

In addition to the optical wavelength conversion element, the optical element utilizing the domain-inverted structure includes, e.g., a polarizer in which the domain-inverted structure is in the form of a prism or grating. The optical element also can be applied to a phase shifter, a light modulator, a lens, or the like. Moreover, the application of a voltage to the domain-inverted regions can control a change in refractive index due to the electrooptic effect. Using this feature, the optical element can constitute, e.g., a switch, a polarizer, a modulator, a phase shifter, or beam shaper. The method of each of the above embodiments can provide a fine domain-inverted structure, and thus can improve the performance of these optical elements.

Figure 19A:
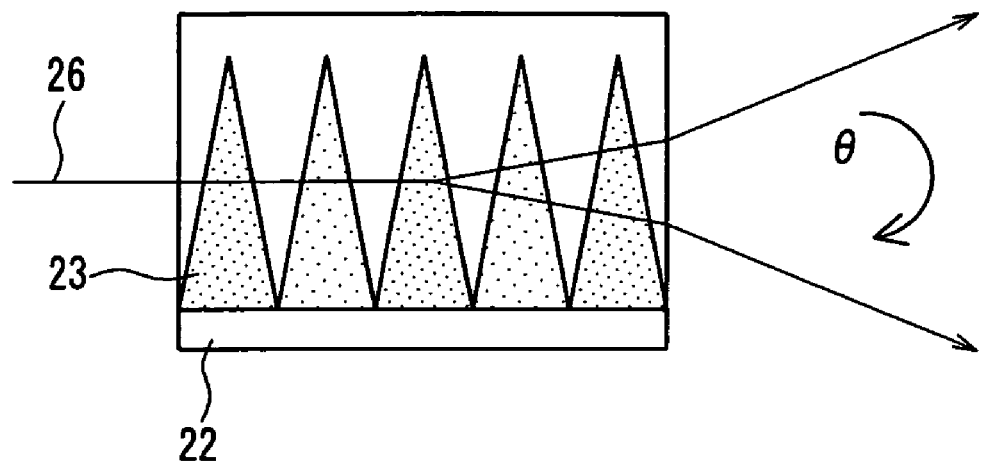
FIG. 19A is a plan view showing an optical deflector as an example of the optical element in Embodiment 6.
Figure 19B:
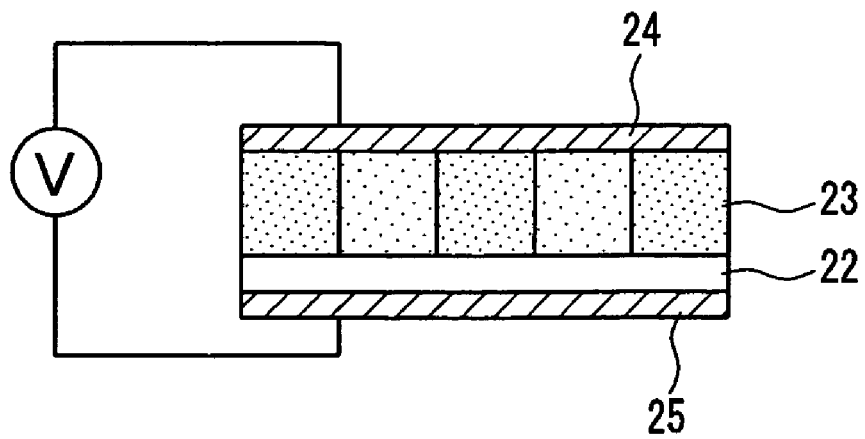
FIG. 19B is a cross-sectional view of FIG. 19A.

FIGS. 19A and 19B show an optical deflector that utilizes domain inversion in the form of a prism. Periodically prism-shaped domain-inverted regions 23 are formed in a ferroelectric substrate 22. Electrodes 24, 25 are formed on the upper and the lower side of the domain-inverted regions 23. The application of an electric field to the electrodes 24, 25 causes a change in refractive index, and thus can control the direction (e.g., an angle θ) of a beam 26. The electrooptic effect in which a refractive index changes with the electric field application depends on the polarization direction. Therefore, when the electric field is applied as shown in the drawing, the sign of a change in refractive index is reversed between the domain-inverted regions 23 and the non-inverted regions. Thus, it is possible to control the direction of refraction of light in the prism portion.

In the above embodiments, the MgO-doped $LiNbO_3$ substrate is used as a ferroelectric substrate. However, other substrates such as a MgO-doped $LiTaO_3$ substrate, Nd-doped $LiNbO_3$ substrate, a KTP substrate, a $KNbO_3$ substrate, a Nd and MgO-doped $LiNbO_3$ substrate, Nd and MgO-doped $LiTaO_3$ substrate, and the same type of substrate having a stoichiometric composition also can be used. Among these substrates, the substrates including Nd-doped crystals can perform laser oscillation. Therefore, they can generate a fundamental by the laser oscillation at the same time as a second harmonic by the wavelength conversion. Thus, it is possible to provide a short-wavelength light source with high efficiency and stable operating characteristics.

INDUSTRIAL APPLICABILITY

According to the present invention, a short-period wide domain-inverted structure can be formed deeply and uniformly in a ferroelectric substrate, and an optical element with excellent properties such as an optical wavelength conversion element can be produced.

The invention claimed is:

1. A method for forming a domain-inverted structure comprising:
   using a ferroelectric substrate having a principal surface substantially perpendicular to a Z axis of crystals of the ferroelectric substrate;
   providing a first electrode on the principal surface of the ferroelectric substrate, the first electrode having a pattern of a plurality of electrode fingers that are arranged periodically;
   providing a counter electrode on the other side of the ferroelectric substrate so as to be opposite from the first electrode; and
   applying an electric field to the ferroelectric substrate with the first electrode and the counter electrode, thereby forming domain-inverted regions corresponding to the pattern of the first electrode in the ferroelectric substrate,
   wherein each of the electrode fingers of the first electrode is located so that a direction from a base to a tip of the electrode finger is aligned with a Y-axis direction of the crystals of the ferroelectric substrate, and
   the electric field is applied to the ferroelectric substrate so that a mean value of a depth D of the domain-inverted regions is 40% to 95% of the thickness of the ferroelectric substrate.

2. The method according to claim 1, wherein the electric field is applied to the ferroelectric substrate so that a ratio of an area of the domain-inverted regions penetrating from the upper to the lower surface of the ferroelectric substrate with respect to a total area of the domain-inverted regions is suppressed to 50% or less.

3. The method according to claim 2, wherein a thickness T of the ferroelectric substrate is 1 mm or more.

4. The method according to claim 1, wherein the ferroelectric substrate is Mg-doped $LiTa_{(1-x)}Nb_xO_3$ ($0 \leq x \leq 1$).

5. The method according to claim 1, wherein the first electrode is a comb-shaped electrode, and the electrode fingers are in the form of stripes.

6. The method according to claim 1, wherein the electrode fingers of the first electrode are in the form of triangles, and a vertex of the triangle serves as the tip of each of the electrode fingers.

7. The method according to claim 1, wherein each of the electrode fingers has a shape that is symmetrical with respect to an axis along the direction from the base to the tip of the electrode finger, and is located so that the axis of symmetry is aligned with the Y-direction of the crystals of the ferroelectric substrate.

8. The method according to claim 1, wherein a width of the tip of each of the electrode fingers is 5 μm or less.

9. The method according to claim 1, wherein a process of applying an electric field to the ferroelectric substrate further comprises applying a pulse voltage with a field intensity of E1 and applying a direct-current voltage with a field intensity of E2, and E1 and E2 satisfy E1>E2.

10. The method according to claim 9, wherein the field intensity E1 is larger than 6 kV/mm, and the field intensity E2 is smaller than 5 kV/mm.

11. The method according to claim 9, wherein the pulse voltage includes at least two pulse trains.

12. The method according to any claim 1, wherein the ferroelectric substrate is heat-treated at 200° C. or more after the domain-inverted regions are formed, and generation of a pyroelectric charge in the ferroelectric substrate is suppressed during the heat treatment.

13. The method according to claim 12, wherein the upper and the lower surface of the ferroelectric substrate are short-circuited electrical during the heat treatment.

14. The method according to claim 12, wherein a rate of temperature rise in the heat treatment is 10° C./min or less.

15. The method according to claim 1, wherein a polarization electric field of the ferroelectric substrate is 5 kV/mm or less.

16. The method according to claim 1, wherein the crystals of the ferroelectric substrate have a substantially stoichiometric composition.

17. The method according to claim 1, wherein a second electrode is provided on the principal surface and is located opposite to the first electrode with a space between the tips of the electrode fingers of the first electrode and the second electrode.

18. The method according to claim 17, wherein a shortest distance L between the tips of the electrode fingers and the second electrode, and a thickness T of the ferroelectric substrate satisfy L<T/2.

19. The method according to claim 17, wherein the domain-inverted regions are formed under the first electrode and the second electrode by applying a voltage between the first electrode and the counter electrode.

20. The method according to claim 19, further comprising:
a first electric field application process of applying a voltage between the first electrode and the counter electrode, and
a second electric field application process of applying a voltage between the second electrode and the counter electrode.

21. The method according to claim 20, wherein the domain-inverted regions are formed under the first electrode and the second electrode by the first electric field application process and the second electric field application process.

22. The method according to claim 21, wherein the first electric field application process and the second electric field application process are performed separately.

23. The method according to claim 17, wherein the second electrode has a plurality of electrode fingers with tips opposed to the tips of the electrode fingers of the first electrode, and the electrode fingers of the second electrode are located so that a direction from a base to a tip of each of the electrode fingers is aligned with the Y-axis direction of the crystals of the ferroelectric substrate.

24. The method according to claim 17, wherein a distance L between the first electrode and the second electrode is 50 μm≦L≦200 μm.

25. The method according to claim 20, wherein either of the first electric field application process and the second electric field application process applies an electric charge at least 100 times larger than 2PsA, where Ps is spontaneous polarization of the ferroelectric substrate and A is a desired area of the domain-inverted regions.

26. The method according to claim 20, wherein the first electric field application process applies a pulse voltage with a field intensity of E1 and a pulse width of τ≦10 msec, the second electric field application process applies a direct-current voltage with a field intensity of E2 and a pulse width of τ≧1 sec, and E1 and E2 satisfy E1>E2.

27. The method according to claim 1, wherein the electric field is applied to the ferroelectric substrate in an insulating solution at 100° C. or more.

28. The method according to claim 1, wherein an angle θ between the principal surface and the Z axis is 80°≦θ≦100°.

29. The method according to claim 1, wherein a thickness T of the ferroelectric substrate is 1 mm or more, and a period Λ of the domain-inverted regions is 2 μm or less.

30. The method according to claim 29, wherein a depth D of the domain-inverted regions and the thickness T of the ferroelectric substrate satisfy D<T.

31. The method according to claim 1, wherein a thickness T of the ferroelectric substrate is T≧1 mm, an insulating layer is formed between the counter electrode and the ferroelectric substrate, and a pulse voltage with a pulse width of 1 msec to 50 msec is applied between the first electrode and the counter electrode.

32. The method according to claim 31, wherein the insulating layer is a $SiO_2$ layer, a $TiO_2$ layer or a $Ta_2O_5$ layer.

33. The method according to claim 1, wherein a thickness T of the ferroelectric substrate is T≧1 mm, a semiconductor layer is formed between the counter electrode and the ferroelectric substrate, and a pulse voltage with a pulse width of 1 msec to 50 msec is applied between the first electrode and the counter electrode.

34. The method according to claim 33, wherein the semiconductor layer is a Si layer, a ZnSe layer, or a GaP layer.

35. An optical element comprising:
a ferroelectric substrate having a plane substantially perpendicular to a Z axis of crystals of the ferroelectric substrate; and
a plurality of domain-inverted regions formed periodically in the ferroelectric substrate,
wherein each of the domain-inverted regions has a planar shape with axial symmetry, and the symmetry axes are parallel to each other, and
wherein the domain-inverted regions are formed so that a direction of the symmetry axes is aligned with a Y axis of crystals of the ferroelectric substrate,
the domain-inverted regions extend from a +Z plane to a −Z plane, and
a ratio of an area of the domain-inverted regions penetrating from the upper to the lower surface of the ferroelectric substrate with respect to a total area of the domain-inverted regions is 50% or less, or a mean depth of the domain-inverted regions is 40% to 95% of a thickness of the ferroelectric substrate.

36. The optical element according to claim 35, wherein the ferroelectric substrate is Mg-doped $LiTa_{(1-x)}Nb_xO_3$ (0≦x≦1).

37. The optical element according to claim 35, wherein a period of the domain-inverted regions is 4 μm or less.

38. The optical element according to claim 35, wherein a thickness of the ferroelectric substrate is 1 mm or more.

39. The optical element according to claim 37, wherein a thickness T of the ferroelectric substrate is 1 mm, and a period Λ of the domain-inverted regions is 2 μm or less.

40. The optical element according to claim 39, where a depth D of the domain-inverted regions and the thickness T of the ferroelectric substrate satisfy D<T.

41. The optical element according to claim 35, wherein an angle θ between the principal surface and the Z axis is 80°≦θ≦100°.

* * * * *

UNITED STATES PATENT AND TRADEMARK OFFICE
CERTIFICATE OF CORRECTION

PATENT NO. : 7,230,753 B2
APPLICATION NO. : 10/535975
DATED : June 12, 2007
INVENTOR(S) : Mizuuchi It is certified that error appears in the above-identified patent and that said Letters Patent is hereby corrected as shown below:

Column 26, line 46(claim 12): "according to any claim 1" should read --according to claim 1--.
Column 26, line 53(claim 13): "short-circuited electrical during" should read --short-circuited electrically during--.

Signed and Sealed this

Thirteenth Day of November, 2007

JON W. DUDAS
*Director of the United States Patent and Trademark Office*